(12) United States Patent  (10) Patent No.: US 8,787,153 B2
Begen et al.  (45) Date of Patent: Jul. 22, 2014

(54) FORWARD ERROR CORRECTION BASED DATA RECOVERY WITH PATH DIVERSITY

(75) Inventors: Ali Begen, San Jose, CA (US); David Oran, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 12/101,796

(22) Filed: Apr. 11, 2008

(65) Prior Publication Data

US 2009/0201805 A1 Aug. 13, 2009

Related U.S. Application Data

(60) Provisional application No. 61/027,483, filed on Feb. 10, 2008.

(51) Int. Cl.
*G01R 31/08* (2006.01)
*G06F 11/00* (2006.01)

(52) U.S. Cl.
USPC .......................................... 370/225; 370/228

(58) Field of Classification Search
USPC ........ 714/20, 755; 341/50; 370/389, 225, 228
See application file for complete search history.

(56) References Cited

U.S. PATENT DOCUMENTS

| | | |
|---|---|---|
| 3,840,862 A | 10/1974 | Ready |
| 4,291,196 A | 9/1981 | Spaniol et al. |
| 4,426,682 A | 1/1984 | Riffe et al. |
| 4,802,085 A | 1/1989 | Levy et al. |
| 4,811,203 A | 3/1989 | Hamstra |
| 5,155,824 A | 10/1992 | Edenfield et al. |
| 5,307,477 A | 4/1994 | Taylor |
| 5,444,718 A | 8/1995 | Ejzak et al. |
| 5,483,587 A | 1/1996 | Hogan et al. |
| 5,524,235 A | 6/1996 | Larson et al. |

(Continued)

FOREIGN PATENT DOCUMENTS

| | | |
|---|---|---|
| CN | 1490976 | 4/2004 |
| CN | 1643857 A | 7/2005 |

(Continued)

OTHER PUBLICATIONS

Nguyen, Thinh and Avideh Zakhor, Protocols for Distributed Video Streaming, Image Processing. 2002. Proceedings. 2002 Int, Dec. 10, 2002, vol. 3, 185-188, ISBN: 0-7803-7622-6.

(Continued)

*Primary Examiner* — Mark Rinehart
*Assistant Examiner* — Gbemileke Onamuti
(74) *Attorney, Agent, or Firm* — Merchant & Gould P.C.

(57) ABSTRACT

A media source sends media packets over a first media path. Repair packets are encoded from the media source packets and sent over a second different media path. Sending the source packets and repair packet over different media paths is referred to as Forward Error Correction (FEC) spatial diversity and reduces the amount of repair packet overhead required for repairing the media source packets in case of a network outage or packet loss. To provide load balancing, a first set of media streams may be sent over the first media path and a second set of media streams may be sent over the second media path. If a fault is detected on one of the media paths, then the repair packets may no longer be transmitted and the one or more media streams from the disabled media path are transmitted over the working media path.

24 Claims, 11 Drawing Sheets

(56) References Cited

U.S. PATENT DOCUMENTS

| | | | |
|---|---|---|---|
| 5,551,001 A | 8/1996 | Cohen et al. |
| 5,600,366 A | 2/1997 | Schulman |
| 5,600,663 A | 2/1997 | Ayanoglu et al. |
| 5,636,354 A | 6/1997 | Lear |
| 5,673,253 A | 9/1997 | Shaffer |
| 5,729,687 A | 3/1998 | Rothrock et al. |
| 5,734,861 A | 3/1998 | Cohn et al. |
| 5,784,362 A | 7/1998 | Turina |
| 5,828,844 A | 10/1998 | Civanlar |
| 5,870,763 A | 2/1999 | Lomet |
| 5,914,757 A | 6/1999 | Dean et al. |
| 5,926,227 A | 7/1999 | Schoner et al. |
| 5,933,195 A | 8/1999 | Florencio |
| 5,933,593 A | 8/1999 | Arun et al. |
| 5,963,217 A | 10/1999 | Grayson et al. |
| 5,974,028 A | 10/1999 | Ramakrishnan |
| 6,003,116 A | 12/1999 | Morita et al. |
| 6,031,818 A | 2/2000 | Lo et al. |
| 6,034,746 A | 3/2000 | Desai et al. |
| 6,065,050 A | 5/2000 | DeMoney |
| 6,119,205 A | 9/2000 | Wicki et al. |
| 6,137,834 A | 10/2000 | Wine et al. |
| 6,141,324 A | 10/2000 | Abbott et al. |
| 6,151,636 A | 11/2000 | Schuster et al. |
| 6,236,854 B1 | 5/2001 | Bradshaw |
| 6,278,716 B1 | 8/2001 | Rubenstein |
| 6,289,054 B1 | 9/2001 | Rhee |
| 6,301,249 B1 | 10/2001 | Mansfield et al. |
| 6,332,153 B1 | 12/2001 | Cohen |
| 6,445,717 B1 | 9/2002 | Gibson et al. |
| 6,501,739 B1 | 12/2002 | Cohen |
| 6,516,435 B1 | 2/2003 | Tsunoda |
| 6,532,562 B1 | 3/2003 | Chou et al. |
| 6,567,929 B1 | 5/2003 | Bhagavath et al. |
| 6,570,926 B1 | 5/2003 | Agrawal et al. |
| 6,594,798 B1 | 7/2003 | Chou et al. |
| 6,608,820 B1 | 8/2003 | Bradshaw |
| 6,608,841 B1 | 8/2003 | Koodli |
| 6,624,841 B1 | 9/2003 | Buchner et al. |
| 6,643,496 B1 | 11/2003 | Shimoyama et al. |
| 6,650,652 B1 | 11/2003 | Valencia |
| 6,671,262 B1 | 12/2003 | Kung et al. |
| 6,675,216 B1 | 1/2004 | Quatrano et al. |
| 6,677,864 B2 | 1/2004 | Khayrallah |
| 6,711,128 B1 | 3/2004 | Ramakrishnan |
| 6,721,290 B1 | 4/2004 | Kondylis et al. |
| 6,735,572 B2 | 5/2004 | Landesmann |
| 6,744,785 B2 | 6/2004 | Robinett et al. |
| 6,766,418 B1 | 7/2004 | Alexander |
| 6,771,644 B1 | 8/2004 | Brassil et al. |
| 6,775,247 B1 | 8/2004 | Shaffer et al. |
| 6,782,490 B2 | 8/2004 | Maxemchuk et al. |
| 6,792,047 B1 | 9/2004 | Bixby et al. |
| 6,804,244 B1 | 10/2004 | Anandakumar et al. |
| 6,816,469 B1 | 11/2004 | Kung et al. |
| 6,823,470 B2 | 11/2004 | Smith et al. |
| 6,839,325 B2 | 1/2005 | Schmidl et al. |
| 6,865,157 B1 | 3/2005 | Scott et al. |
| 6,865,540 B1 | 3/2005 | Faber et al. |
| 6,876,734 B1 | 4/2005 | Summers et al. |
| 6,909,718 B1 | 6/2005 | Aramaki et al. |
| 6,910,148 B1 | 6/2005 | Ho et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,976,055 B1 | 12/2005 | Shaffer et al. |
| 6,989,856 B2 | 1/2006 | Firestone et al. |
| 6,996,097 B1 | 2/2006 | Chou et al. |
| 7,003,086 B1 | 2/2006 | Shaffer et al. |
| 7,007,098 B1 | 2/2006 | Smyth et al. |
| 7,024,609 B2 | 4/2006 | Wolfgang et al. |
| 7,084,898 B1 | 8/2006 | Firestone et al. |
| 7,114,002 B1 | 9/2006 | Okumura et al. |
| 7,127,487 B1 | 10/2006 | Wang et al. |
| 7,164,680 B2 | 1/2007 | Loguinov |
| 7,180,896 B1 | 2/2007 | Okumura et al. |
| 7,224,702 B2 | 5/2007 | Lee |
| 7,234,079 B2 * | 6/2007 | Cheng et al. .................... 714/20 |
| 7,257,664 B2 | 8/2007 | Zhang |
| 7,263,075 B2 | 8/2007 | Roh et al. |
| 7,296,205 B2 | 11/2007 | Curcio et al. |
| 7,324,527 B1 | 1/2008 | Fraas et al. |
| 7,333,439 B2 | 2/2008 | Itoh et al. |
| 7,366,172 B2 | 4/2008 | Chou et al. |
| 7,373,413 B1 | 5/2008 | Bich |
| 7,376,880 B2 | 5/2008 | Ichiki et al. |
| 7,379,653 B2 | 5/2008 | Yap et al. |
| 7,392,424 B2 | 6/2008 | Ho et al. |
| 7,397,759 B2 | 7/2008 | Tan et al. |
| 7,532,621 B2 * | 5/2009 | Birman et al. ................. 370/389 |
| 7,562,277 B2 | 7/2009 | Park et al. |
| 7,599,363 B2 | 10/2009 | Jang et al. |
| 7,676,591 B2 | 3/2010 | Chan et al. |
| 7,681,101 B2 | 3/2010 | Oran et al. |
| 7,697,514 B2 | 4/2010 | Chou et al. |
| 7,707,303 B2 | 4/2010 | Albers |
| 7,711,938 B2 | 5/2010 | Wise |
| 7,747,921 B2 | 6/2010 | DaCosta |
| 7,751,324 B2 | 7/2010 | Vadakital et al. |
| 7,801,146 B2 | 9/2010 | Aramaki et al. |
| 7,870,590 B2 | 1/2011 | Jagadeesan et al. |
| 7,877,660 B2 | 1/2011 | VerSteeg |
| 7,886,073 B2 | 2/2011 | Gahm |
| 7,889,654 B2 | 2/2011 | Ramakrishnan et al. |
| 7,921,347 B2 | 4/2011 | Kim et al. |
| 7,937,531 B2 | 5/2011 | Mitra |
| 7,940,644 B2 | 5/2011 | Oran |
| 7,940,777 B2 | 5/2011 | Asati |
| 7,965,771 B2 | 6/2011 | Wu |
| 8,031,701 B2 | 10/2011 | Oran |
| 8,218,654 B2 | 7/2012 | Cheng |
| 8,245,264 B2 | 8/2012 | Toebes |
| 8,462,847 B2 | 6/2013 | Wu et al. |
| 8,588,077 B2 | 11/2013 | Oran |
| 8,711,854 B2 | 4/2014 | Oran et al. |
| 2001/0000540 A1 | 4/2001 | Cooper et al. |
| 2002/0004841 A1 | 1/2002 | Sawatari |
| 2002/0006137 A1 | 1/2002 | Rabenko et al. |
| 2002/0010938 A1 | 1/2002 | Zhang et al. |
| 2002/0087976 A1 | 7/2002 | Kaplan et al. |
| 2002/0114332 A1 | 8/2002 | Apostolopoulos et al. |
| 2002/0126711 A1 | 9/2002 | Robinett et al. |
| 2002/0163918 A1 | 11/2002 | Cline |
| 2003/0025786 A1 | 2/2003 | Norsworthy |
| 2003/0025832 A1 | 2/2003 | Swart et al. |
| 2003/0076850 A1 | 4/2003 | Jason, Jr. |
| 2003/0101408 A1 | 5/2003 | Martinian et al. |
| 2003/0158899 A1 | 8/2003 | Hughes |
| 2003/0198195 A1 | 10/2003 | Li |
| 2003/0231863 A1 | 12/2003 | Eerenberg et al. |
| 2003/0236903 A1 | 12/2003 | Piotrowski |
| 2004/0057449 A1 | 3/2004 | Black |
| 2004/0071128 A1 | 4/2004 | Jang et al. |
| 2004/0078624 A1 | 4/2004 | Maxemchuk et al. |
| 2004/0100937 A1 | 5/2004 | Chen |
| 2004/0114576 A1 | 6/2004 | Itoh et al. |
| 2004/0143672 A1 | 7/2004 | Padmanabham et al. |
| 2004/0165527 A1 | 8/2004 | Gu et al. |
| 2004/0165710 A1 | 8/2004 | DelHoyo et al. |
| 2004/0196849 A1 | 10/2004 | Aksu et al. |
| 2004/0199659 A1 | 10/2004 | Ishikawa et al. |
| 2004/0213152 A1 | 10/2004 | Matuoka et al. |
| 2004/0244058 A1 | 12/2004 | Carlucci et al. |
| 2004/0255328 A1 | 12/2004 | Baldwin et al. |
| 2005/0058131 A1 | 3/2005 | Samuels et al. |
| 2005/0069102 A1 | 3/2005 | Chang |
| 2005/0074007 A1 | 4/2005 | Samuels et al. |
| 2005/0078171 A1 | 4/2005 | Firestone et al. |
| 2005/0078698 A1 | 4/2005 | Araya et al. |
| 2005/0081244 A1 | 4/2005 | Barrett et al. |

(56) References Cited

U.S. PATENT DOCUMENTS

| | | |
|---|---|---|
| 2005/0099499 A1 | 5/2005 | Braustein |
| 2005/0138372 A1 | 6/2005 | Kajihara et al. |
| 2005/0169174 A1 | 8/2005 | Apostolopoulos et al. |
| 2005/0198367 A1 | 9/2005 | Ettikan |
| 2005/0204242 A1 | 9/2005 | Chou et al. |
| 2005/0207406 A1 | 9/2005 | Reme |
| 2005/0226325 A1 | 10/2005 | Dei et al. |
| 2005/0244137 A1 | 11/2005 | Takashima et al. |
| 2005/0249231 A1 | 11/2005 | Khan |
| 2005/0259803 A1 | 11/2005 | Khartabil |
| 2005/0265346 A1 | 12/2005 | Ho et al. |
| 2005/0289623 A1 | 12/2005 | Midani et al. |
| 2006/0020995 A1 | 1/2006 | Opie et al. |
| 2006/0048193 A1 | 3/2006 | Jacobs et al. |
| 2006/0072596 A1 | 4/2006 | Spilo et al. |
| 2006/0075084 A1 | 4/2006 | Lyon |
| 2006/0075443 A1 | 4/2006 | Eckert |
| 2006/0083263 A1 | 4/2006 | Jagadeesan et al. |
| 2006/0085551 A1 | 4/2006 | Xie et al. |
| 2006/0104458 A1 | 5/2006 | Kenoyer |
| 2006/0120378 A1 | 6/2006 | Usuki et al. |
| 2006/0126667 A1 | 6/2006 | Smith et al. |
| 2006/0143669 A1 | 6/2006 | Cohen |
| 2006/0159093 A1 | 7/2006 | Joo et al. |
| 2006/0187914 A1 | 8/2006 | Gumaste et al. |
| 2006/0188025 A1 | 8/2006 | Hannuksela |
| 2006/0189337 A1 | 8/2006 | Farrill et al. |
| 2006/0200842 A1 | 9/2006 | Chapman et al. |
| 2006/0242240 A1 | 10/2006 | Parker et al. |
| 2006/0242669 A1 | 10/2006 | Wogsberg |
| 2006/0259755 A1 | 11/2006 | Kenoyer |
| 2006/0279437 A1* | 12/2006 | Luby et al. ................... 341/50 |
| 2007/0008934 A1 | 1/2007 | Balasubramanian et al. |
| 2007/0009235 A1 | 1/2007 | Walters et al. |
| 2007/0044130 A1 | 2/2007 | Skoog |
| 2007/0076703 A1 | 4/2007 | Yoneda et al. |
| 2007/0098079 A1 | 5/2007 | Boyce et al. |
| 2007/0110029 A1 | 5/2007 | Gilmore, II et al. |
| 2007/0123284 A1 | 5/2007 | Schliwa-Bertling et al. |
| 2007/0133435 A1 | 6/2007 | Eneroth et al. |
| 2007/0200949 A1 | 8/2007 | Walker et al. |
| 2007/0204320 A1 | 8/2007 | Wu et al. |
| 2007/0214490 A1 | 9/2007 | Cheng et al. |
| 2007/0268899 A1 | 11/2007 | Cankaya |
| 2007/0277219 A1 | 11/2007 | Toebes et al. |
| 2007/0292107 A1 | 12/2007 | Yahata et al. |
| 2008/0022340 A1 | 1/2008 | Hannuksela et al. |
| 2008/0062990 A1 | 3/2008 | Oran |
| 2008/0189489 A1 | 8/2008 | Mitra |
| 2008/0192839 A1 | 8/2008 | Gahm et al. |
| 2008/0225850 A1 | 9/2008 | Oran |
| 2008/0253369 A1 | 10/2008 | Oran |
| 2008/0256409 A1 | 10/2008 | Oran et al. |
| 2008/0267078 A1 | 10/2008 | Farinacci |
| 2008/0310435 A1 | 12/2008 | Cagenius et al. |
| 2009/0034627 A1 | 2/2009 | Rodriguez |
| 2009/0034633 A1 | 2/2009 | Rodirguez |
| 2009/0049361 A1* | 2/2009 | Koren et al. ................... 714/755 |
| 2009/0055540 A1 | 2/2009 | Foti et al. |
| 2009/0119722 A1 | 5/2009 | VerSteeg |
| 2009/0150715 A1 | 6/2009 | Pickens |
| 2009/0201803 A1 | 8/2009 | Filsfils |
| 2009/0213726 A1 | 8/2009 | Asati |
| 2009/0217318 A1 | 8/2009 | VerSteeg et al. |
| 2010/0005360 A1 | 1/2010 | Begen |
| 2010/0036962 A1 | 2/2010 | Gahm |
| 2011/0131622 A1 | 6/2011 | Wu et al. |
| 2011/0161765 A1 | 6/2011 | Oran |
| 2012/0189007 A1 | 7/2012 | Oran et al. |
| 2014/0029628 A1 | 1/2014 | Oran |

FOREIGN PATENT DOCUMENTS

| | | |
|---|---|---|
| CN | 1947399 | 4/2007 |
| EP | 1271953 | 1/2003 |
| EP | 1553735 | 7/2005 |
| EP | 1581005 | 9/2005 |
| EP | 1608116 | 12/2005 |
| EP | 1670252 | 6/2006 |
| EP | 2008728919 | 2/2008 |
| EP | 7814245.2 | 5/2009 |
| EP | 2007814246 | 6/2009 |
| EP | 8731381.3 | 11/2009 |
| EP | 2220845 | 8/2010 |
| WO | 9718637 | 5/1997 |
| WO | 0019693 | 4/2000 |
| WO | 0035201 | 6/2000 |
| WO | 0076113 | 12/2000 |
| WO | 0161909 | 8/2001 |
| WO | 2005/048519 A1 | 5/2005 |
| WO | 2006031925 | 3/2006 |
| WO | 2006057606 | 6/2006 |
| WO | 2006107424 | 10/2006 |
| WO | 2008000289 | 1/2008 |
| WO | 2008033644 | 3/2008 |
| WO | 2008033645 | 3/2008 |
| WO | 2008100725 | 8/2008 |
| WO | 2008/112465 | 9/2008 |
| WO | 2008112465 | 9/2008 |
| WO | 2009/058645 | 5/2009 |
| WO | 2009099847 | 8/2009 |

OTHER PUBLICATIONS

Pendleton, et al., Session Initiation Protocol Package for Voice Quality Reporting Event draft-ietf-sipping-rtcp-summary-01, Telchemy Incorporated, http://www.ietf.org/internet-drafts/draft-ieft-sippin-rtcp-summaryy-01.txt, pp. 1-24. Feb. 2006.

Schulzrinne, et al., RTP: A Transport Protocol for Real-Time Applications, Network Working Group, 2002, pp. 1-92.

Stolowitz Ford Cowger LLP, Listing of related cases Aug. 25, 2009.

International Search Report for PCT/US09/032305; Date of mailing Oct. 5, 2009.

Written Opinion of the International Searching Authority for PCT/US09/032305; Date of mailing Oct. 5, 2009.

International Search Report for PCT/US08/55837; Date of mailing Jul. 3, 2008.

Written Opinion of the International Searching Authority for PCT/US08/55837; Date of mailing Jul. 3, 2008.

USPTO, PCT International Search Report for PCT/US07/76264, Jul. 7, 2008, 3 pgs.

Rosenberg, J., et al., "Registration of parityfec MME types", RFC 3009, Nov. 2000, 11 pgs.

Luby, M., et al., "Forward Error Correction (FEC) Building Block", RFC 3452, Dec. 2002, 16 pages.

Luby, M., et al., "Compact Forward Error Correction (FEC) Schemes", RFC 3695, Feb. 2004, 14 pages.

Ott, J., et al., "Extended RTP Profile for RTCP-based Feedback (RTP/AVPF)",RFC 4585; draft-ietf-avt-rtcp-feedback-11, Aug. 10, 2004, 52 pages.

Watson, M., "Basic Forward Error Correction (FEC) Schemes", draft-ietf-rmt-bb-fec-basic-schemes-revised-02, Mar. 3, 2006, 17 pages.

Chesterfield, J., et al., "RTCP Extensions for Single-Source Multicast Sessions", draft-ietf-avt-rtcpssm-11, Mar. 6, 2006, 67 pages.

Rey, J., et al., "RTP Retransmission Payload Format", RFC 4588, Jul. 2006, 24 pages.

Duffy, "Riverstone Recasts Multicast Video", 2 pages, Aug. 5, 2002, Network World Inc., www.networkworld.com/edge/news/2002/0805edge.html.

Lehman et al., Active Reliable Multicast (ARM), 1998, IEEE, pp. 581-589.

Liang et al., Feedback suppression in reliable multicast protocol, 2000, IEEE, pp. 1436-1439.

Adamson et al., Negative-Acknowledgment (NACK)-Oriented Reliable Multicast (NORM) Building Blocks (RFC 3941), Nov. 2004, RFC 3941 (IETF, ORG), pp. 1-37.

(56) References Cited

OTHER PUBLICATIONS

Written Opinion of the International Searching Authority for PCT/US08/52907; Mailing Date Jul. 7, 2008.
Written Opinion of the International Searching Authority for PCT/US07/76264; Mailing date Jul. 7, 2008.
International Search Report for PCT/US07/76265 ; Mailing date Aug. 20, 2008.
Written Opinion of the International Searching Authority for PCT-US07-76265; Aug. 20, 2008.
Degalahal, et al., Analyzing Soft Errors in Leakage Optimized SRAM Design, Article, Jan. 2003, pp. 1-7, 16th International Conference on VLSI Design.
Zhang, Computing Cache Vulnerablity to Ransietn Errors and It's Implication, Article, Oct. 2005, pp. 1-9, IEEE Computer Society.
Weaver, et al. Reducing the Soft-Error Rate of a High-Performance Microprocessor, Article, 2004, pp. 30-37, IEEE Computer Society.
Li, et al., Soft Error and Energy Consumption Interactions: A Data Cache Perspective, Article, Aug. 9, 2004, pp. 1-6, ISLPED '04.
USPTO, PCT International Search Report for PCT/US08/52907, Jul. 7, 2008, 3 pgs.
Stolowitz Ford Cowger LLP, Listing of related cases Mar. 3, 2010.
Supplementary European Search Report for EP08731381, Mar. 26, 2010, 7 pages.
Rey et al., "RTP Retransmission Payload Format—RFC 4588", Jul. 1, 2006, 29 pages.
Handley, M. et al., "SIP: Session Initiation Protocol", RFC 2543, Mar. 1999.
T. Friedman, "RTP Control Protocol Extended Reports (RTCP XR)", RFC 3611, Nov. 2003.
Ott, "Extended RTP Profile for RTCP-based Feedback (RTP/AVPF)" draft-ieft-av-rtcp-feedback-01-txt., Nov. 21, 2001.
Approach Inc., "Streaming Media Technical Analysis", Nov. 2000.
Turner, Jonathan S., "WDM Burst Switching" www.isoc.org/inet99/proceedings/4j/4j_3.htm, 1999.
GossamerThreads, "Channel Change Speed", www.gossamer-threads.com/lists/engine?do=post_view_flat;post=13776, Sep. 12, 2003.
Nguyen, Thinh et.al., Protocols for Distributed Video Streaming, IEEE ICIP 2002.
Byers, John W. et al., Accessing Multiple Mirror Sites in Parallel: Using Tornado Codes to Speed Up Downloads, IEEE 1999.
Cisco Systems, Cisco Visual Quality Experience: Product Overview, www.cisco.com/en/US/partner/prod/collateral/video/ps7191/ps7126/product_data_sheet0900aecd8057f446.html, 2009.
Cisco Systems, Converge IP and DWDM Layers in the Core Network, http://www.cisco.com/en/US/prod/collateral/routers/ps5763/prod_white_paper0900aecd80395e03.html, 2007.
Silver Peak Systems, Inc., "Data Center Class WAN Optimization: Latency & Loss Mitigation", www.silver-peak.com/Technology/latency_loss_mitigation.htm., 2010.
P. A. Chou and Z. Miao, "Rate-distortion optimized streaming of packetized media," Microsoft Research Technical Report MSR-TR-2001-35, Feb. 2001.
European Search Report for EP08728919; Aug. 19, 2010; 11 pgs.
Begen, Ali C., Enhancing the Multimedia Experience in Emerging Network, A Thesis Presented to The Academic Faculty; Dec. 2006; available at http://etd.gatech.edu/theses/available/etd-11062006-002415/.
Lee, Jung-Hoon, J.S. Lee, and S.D. Kim. "A selective temporal and aggressive spatial cache system based on time interval." 2000 International Conference on Computer Design (IEEE), Proceedings, Sep. 17-20, 2000.
Rajamoni, Ramakrishnan, R. Bhagavathula, and R. Pendse. "Timing analysis of block replacement algorithms on disk caches." 43rd IEEE Midwest Symposium on Circuits and Systems, Proceedings, Aug. 8-11, 2000.
U.S. Office Action (Ex Parte Quayle) dated Sep. 20, 2013 cited in U.S. Appl. No. 13/435,431, 7 pgs.
Copending U.S. Appl. No. 14/045,813, filed Oct. 4, 2013 entitled "Retransmission-Based Stream Repair and Stream Join".

U.S. Office Action dated Apr. 9, 2013 cited in U.S. Appl. No. 11/831,906, 22 pgs.
Chinese Third Office Action dated Dec. 3, 2012 cited in Appl. No. 200780022360.X, 8 pgs.
Brassil, Jack, et al., "Structuring Internet Media Streams with Cueing Protocols," IEEE/ACM Transactions on Networking, IEEE/ACM New York, NY, vol. 10, No. 4, Aug. 2002, XP011077174; Abstract Only.
Castro H., et al., "Monitoring Emerging IPv6 Wireless Access Networks," IEEE Wireless Communications, IEEE Service Center, Piscataway, NJ, vol. 12, No. 1, Feb. 2005, XP011127719.
International Search Report for PCT/US08/80882 dated Mar. 3, 2009, 3 pgs.
International Preliminary Report on Patentability (1 pg.) and Written Opinion of the International Search Authority (6 pgs.) for PCT/US08/80882 dated May 4, 2010.
U.S. Office Action dated Jan. 2, 2013 cited in U.S. Appl. No. 13/016,773, 36 pgs.
U.S. Final Office Action dated Jan. 7, 2013 cited in U.S. Appl. No. 11/674,093, 26 pgs.
U.S. Final Office Action dated Dec. 31, 2013 cited in U.S. Appl. No. 11/674,093, 8 pgs.
European Search Report dated Mar. 7, 2013 cited in Appl. No. 07814246.0, 9 pgs.
Wonyong Yoon et al., "A Combined Group/Tree Approach for Scalable Many-to-many Reliable Multicast," Proceedings IEEE Infocom., vol. 3, Jun. 23, 2002, pp. 1336-1345.
Victor O.K. Li et al., "Internet Multicast Routing and Transport Control Protocols," Proceedings of IEEE, vol. 90, No. 3, Mar. 1, 2002, pp. 360-391.
Hrishikesh Gossain et al., "Multicast: Wired to Wireless," IEEE Communications Magazine, IEEE Service Center, vol. 40, No. 6, Jun. 1, 2002, pp. 116-123.
A. Erramilli et al., "A Performance Analysis of Protocols for Multicast Communication in Broadband Packet Networks," XP010077385, Jun. 13, 1988, pp. 222-226.
Chinese Fourth Office Action dated Mar. 25, 2013 cited in Appl. No. 200780022360.X, 7 pgs.
Schulzrinne, H., "RTP: A Transport Protocol for Real-Time Applications," RFC 3550, Jul. 2003, 89 pgs.
Chinese First Office Action dated Aug. 3, 2010 cited in Appl. No. 200880004738.8, 16 pgs.
Chinese Second Office Action dated May 20, 2011 cited in Appl. No. 200880004738.8, 11 pgs.
Chinese First Office Action dated Jul. 4, 2011 for Appl. No. 200780022360.X, 11 pgs.
European Office Action dated Oct. 27, 2011 cited in Appl. No. 08 728 919.5 6 pgs.
Chinese Third Office Action dated Oct. 28, 2011 cited in Appl. No. 200880004738.8, 9 pgs.
Chinese Fourth Office Action dated Feb. 22, 2012 cited in Appl. No. 200880004738.8, 7 pgs.
Chinese Second Office Action dated Jul. 2, 2012 for Appl. No. 200780022360.X, 12 pgs.
U.S. Office Action dated Jul. 16, 2010 cited in U.S. Appl. No. 11/674,093, 30 pgs.
U.S. Final Office Action dated Dec. 21, 2010 cited in U.S. Appl. No. 11/674,093, 23 pgs.
U.S. Office Action dated Jul. 16, 2012 cited in U.S. Appl. No. 11/674,093, 38 pgs.
U.S. Office Action dated Sep. 27, 2011 cited in U.S. Appl. No. 12/168,772, 17 pgs. (not M&G case).
U.S. Final Office Action dated Jan. 10, 2012 cited in U.S. Appl. No. 12/168,772, 15 pgs. (not M&G case).
U.S. Office Action dated Oct. 24, 2012 cited in U.S. Appl. No. 13/435,431, 25 pgs.
U.S. Office Action dated Oct. 31, 2012 cited in U.S. Appl. No. 13/043,437, 37 pgs.
U.S. Final Office Action dated Nov. 13, 2013 cited in U.S. Appl. No. 11/831,906, 32 pgs.

(56) References Cited

OTHER PUBLICATIONS

U.S. Final Office Action dated Dec. 9, 2013 cited in U.S. Appl. No. 12/168,772, 16 pgs.
U.S. Office Action dated Jun. 20, 2013 cited in U.S. Appl. No. 11/674,093, 25 pgs.
U.S. Final Office Action dated Apr. 11, 2013 cited in U.S. Appl. No. 13/043,437, 11 pgs.
U.S. Final Office Action dated Apr. 16, 2013 cited in U.S. Appl. No. 13/435,431, 18 pgs.
U.S. Final Office Action mailed Mar. 21, 2014 in U.S. Appl. No. 12/168,772, 16 pgs.

* cited by examiner

FORWARD ERROR CORRECTION BASED DATA RECOVERY WITH PATH DIVERSITY

This application claims priority to U.S. Provisional Patent Application Ser. No. 61/027,483, filed Feb. 10, 2008 which is incorporated by reference in its entirety.

TECHNICAL FIELD

The present disclosure relates generally to networking.

BACKGROUND

Video and other types of media are sensitive to packet loss and any entertainment-caliber video service should provide essentially loss-free video delivery from the media source to the media receiver(s). Packet loss can be due to congestion, link errors, and re-routing events. Individual losses or short burst losses can be adequately repaired with Forward Error Correction (FEC) or selective retransmission techniques, depending on the exact nature of the error and the delay in the network.

Selective retransmission is workable only where there is a very short round-trip time between the receivers and the transmitter. In addition, it is difficult and complex to limit the duration of certain outages in packet networks through techniques like Multi-Protocol Label Switching (MPLS) or IP Fast ReRoute (FRR).

Outages in a packet-switched or label-switched core network are usually due to a link or path failure or device/interface failure. Measurements from real deployments show that it usually takes between 50 and 500 milliseconds (ms) to restore the data path, or converge to a new one, and resume packet transmission. The packets that are sent or in flight during the outage are usually lost. In order to provide a robust video delivery, these losses should be repaired within the time frame that would satisfy the real-time requirements of the video application.

INTRODUCTION

A media source sends media packets over a first media path. Repair packets are encoded from the media source packets and sent over a second different media path. Sending the source packets and repair packet over different media paths is referred to as Forward Error Correction (FEC) spatial diversity and reduces the amount of repair packet overhead required for repairing the media source packets in case of a network outage or packet loss. To provide load balancing, a first set of media streams may be sent over the first media path and a second set of media streams may be sent over the second media path. If a fault is detected on one of the media paths, then the repair packets may no longer be transmitted and the one or more media streams from the disabled media path are transmitted over the working media path.

The foregoing and other objects, features and advantages will become more readily apparent from the following detailed description of a preferred embodiment which proceeds with reference to the accompanying drawings.

DETAILED DESCRIPTION

Figure 1:
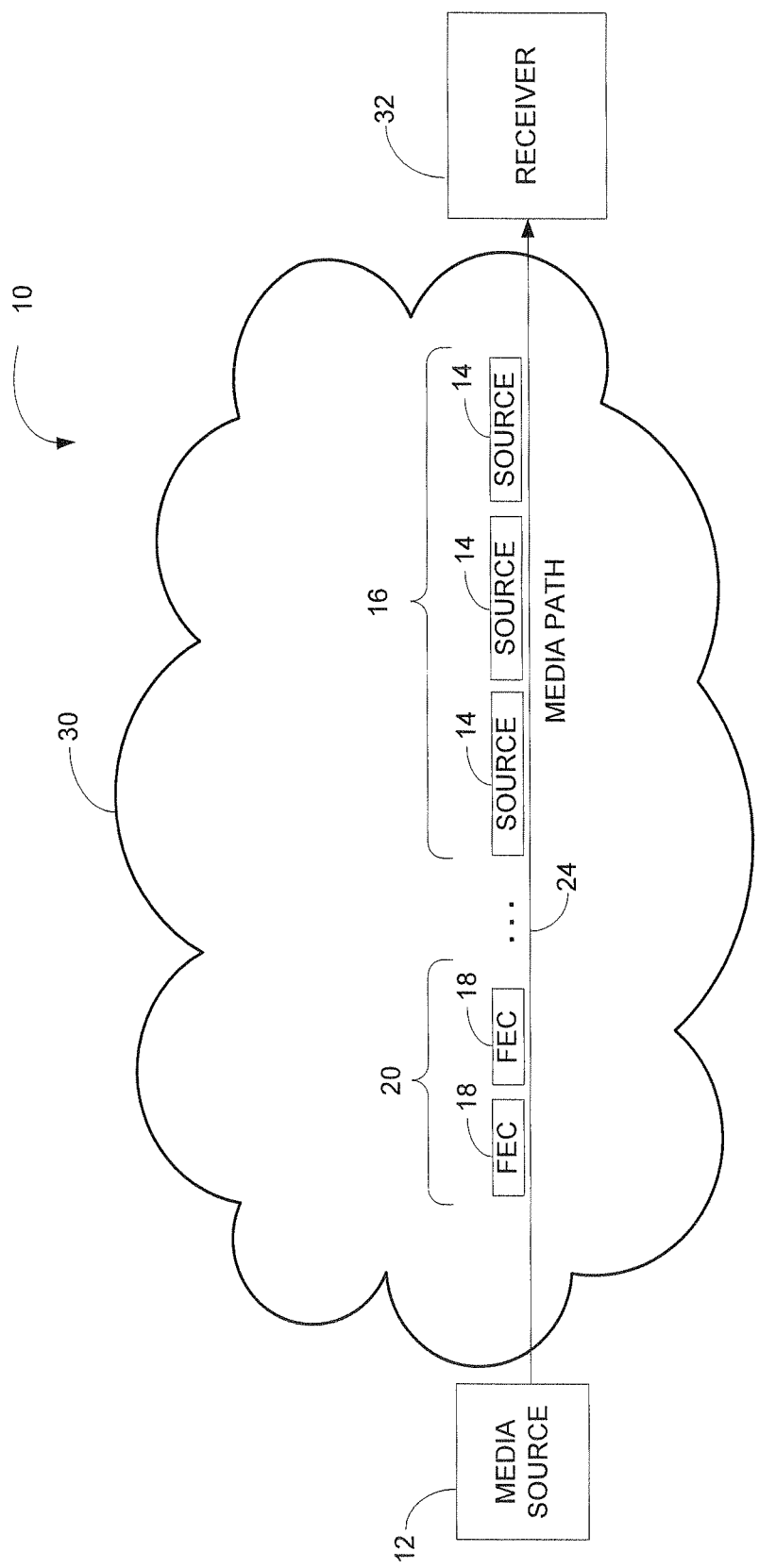
FIG. 1 is a diagram of a network that uses temporal diversity to send both source packets and FEC packets over the same media path.

Referring to FIG. 1, a network 10 includes a media source 12 that transmits a media stream of source packets 14 over a packet switched network 30 to a receiver 32. The network 10 is any combination of Wide Area Networks (WANs) and Local Area Networks (LANs) that together form the Internet. The subset of this network 30 over which the correction scheme operates can be any combination of routers, switches and/or other network devices that form a portion of the Internet.

The media source 12 is any device that can transmit a media stream over a media path 24 in network 30 and the receiver 32 can be any device that receives the media stream. For example, the media source 12 can be a network server and the receiver 32 can be a Personal Computer (PC), set-top box, cable modem, Digital Subscriber Loop (DSL) modem, or any other type of wired or wireless device that received packet data. For example, the receiver 32 can also be a wireless Personal Digital Assistant (PDA) or cellular telephone. In another embodiment shown in FIG. 5B, media source 12 and/or receiver 32 may instead be intermediary devices in the network 30, such as routers, switches, gateways, etc.

Source packets 14 form the media stream sent over media path 40 and can contain any type of real-time media. For example, the source packets 14 can contain video data and/or audio data. The source packets can also include digital data. Groups of source packets 14 are referred to as a source block 16.

Forward Error Correction (FEC) packets 18 are generated from the source packets 14 by the media source 12 or another device. The FEC packets 18 are alternatively referred to as repair packets and a group of repair packets 18 used for repairing packets in source block 16 are together referred to as a repair block 20. The repair packets 18 are used to repair lost or corrupted source packets 14 in source block 16.

In this example, the source packets 14 and the FEC repair packets 18 are transmitted to the receiver(s) 32 over the same media path 24. Sending both the source packets 14 and the repair packets 18 over the same media path 24 but at different times is referred to as temporal diversity. Temporal diversity is alternatively referred to as interleaving because both the source packets 14 and FEC packets 18 are interleaved together on the same media path 24 but transmitted at different times so that their occupancy periods on the network 30 are disjoint.

At the receiver 32, missing source packets 14 are recovered by erasure decoding provided that a sufficient number of source packets 14 and repair packets 18 are received. Recovery probability increases with the number of repair packets 18 provided per source block 16. One way to reduce the bandwidth overhead required for packet repair is to increase the size of source block 16. In other words, overhead can be decreased by increasing the ratio of the number of transmitted source packets (or bytes) 14 to the number of transmitted repair packets (or bytes) 18. However, as the size of source block 16 increases so does the playout delay relative to the encoding time or ingestion time. Thus, the size of source block 16 cannot be increased arbitrarily. The maximum tolerable time difference between the first source packet in a source block and the last repair packet in the repair block that protects this source block is referred to as the latency budget. In real-time applications, the value for the latency budget is often preferred to be small, and its value may be adjusted based on various application, user and network requirements.

Sending both the source packets 14 and FEC packets 18 on the same media path 24 causes the FEC packets 18 to likely arrive after all of the source packets 14 in the source block 16. If the source block 16 is too large, the time from the first source packet 14 in source block 16 to the last FEC packet 18 in repair block 20 may be longer than the latency budget. Violating this latency budget means that the FEC packets 18 in repair block 20 will not be able to repair all of the source packets 14 in source block 16.

For example, some source packets 14 lost at the beginning of the source block 16 may be dropped by the receiver 32 prior to receiving the necessary FEC packets 18 from repair block 20. Even if the buffer size in the receiver 32 were increased, longer latency budgets increase both the end-to-end reception delay and consequently the time required for the receiver 32 to wait before playing out the content initially or to resume the playout after a fast-forward/rewind operation in video-on-demand, or to switch among different media streams, e.g., channel change in IP television.

Figure 2A:
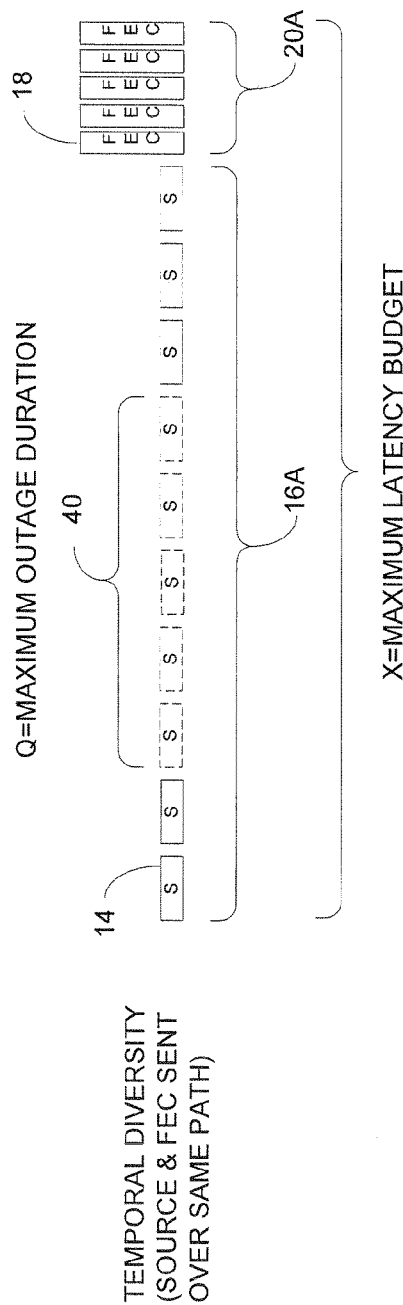
FIGS. 2A and 2B are diagrams explaining how repair packet overhead limitations are associated with temporal diversity.

To explain further, FIG. 2A shows a series of source packets 14 that are transmitted over the media path 24 in FIG. 1. A value Q denotes a maximum outage duration 40 that is intended to be repairable. Any outages longer than Q are not completely repairable. For example, Q may be associated with the amount of time required for the network 30 in FIG. 1 to reconverge to another media path when there is an outage. The value of Q in one example is specified in milliseconds (ms).

The source block 16A is a group of source packets 14 that are repairable with the FEC packets 18 in repair block 20A. When an outage 40 hits the source block 16A, the number of FEC packets 18 in repair block 20A should be sufficient to recover the maximum outage duration 40. Recall that the packets 14 and 18 are sent over the same media path 24. Thus, any source packets 14 or FEC repair packets 18 transmitted during that Q-ms outage 40 are lost.

FEC codes such as Reed-Solomon codes can recover the packets 14 dropped during the outage duration 40 provided that a minimum amount of repair information is available in the repair block 20A. Some sub-optimal FEC codes may require more repair information for full recovery. Thus, at least Q-ms worth of source data needs to be contained in the repair block 20A.

One definition of overhead is the number of bytes in repair block 20A over the number of bytes in source block 16A. The maximum latency budget X refers to the maximum amount of acceptable latency for error-repair (e.g., FEC) operations in the network 10 shown in FIG. 1. For example, the maximum latency budget X may be chosen based on the amount of delay tolerable by the receiver 32 in FIG. 1 to switch between media streams. The value of X is specified in milliseconds (ms).

The latency budget could also be bounded by the amount of available buffer space in the receiver 32 in FIG. 1. More buffer space may result in a longer amount of time available to repair lost source packets 14. The lower bound for the amount of overhead required to repair a media stream exists when the size of source block 16A is equal to the maximum latency budget X as shown in FIG. 2A.

With a maximum outage duration of Q and a latency budget of X, the best case overhead required to repair outage duration Q is:

$$\text{Overhead} \geq Q/X \qquad \text{Equation 1.0}$$

In the example shown in FIG. 2A, the latency budget X is proportional to 10 source packets and the maximum outage duration Q is proportional to 5 source packets. Thus, the minimum amount of overhead required to repair a maximum outage duration Q is:

$$\text{Overhead} = 5 \div 10 = 0.5 = 50\%$$

However, in real-time applications where temporal diversity is used, it is not possible to achieve this lower bound. For example, not all source packets 14 may be available at the beginning of the repair block 20A. Further, once the source packets 14 in source block 16A are generated after X-ms, all FEC packets 18 in repair block 20A would need to be transmitted instantaneously so that both the source packets 14 and repair packets 20 arrive within the latency budget X. Remember, that any FEC packet 18 received outside of latency budget X might not be usable for repairing lost source packets 14 in source block 16A.

FIG. 2A shows that the minimum overhead exists when the source block 16A is close to the duration of the maximum latency budget X. However, FIG. 2A also shows that the source block 16A cannot be extended to the maximum latency budget X in a temporal diversity scheme since additional time is needed during the latency period X to transmit FEC packets 18.

Figure 2B:
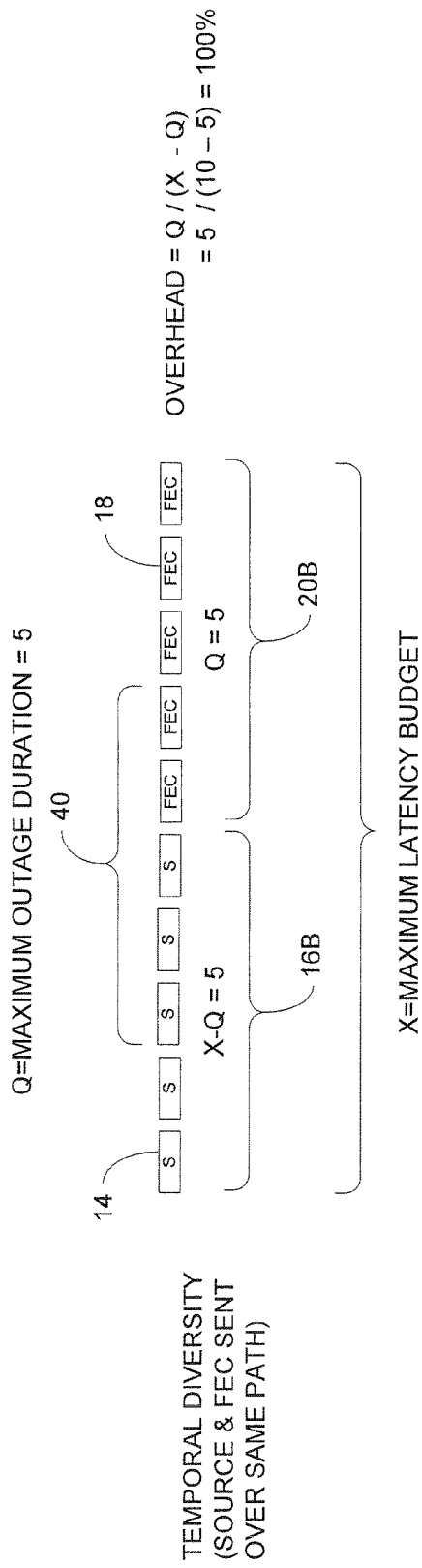

FIG. 2B shows one solution that addresses the physical limitations of a temporal diversity scheme where both the source packets 14 and repair packets 18 are sent over the same media stream 24 (FIG. 1). As mentioned above, the source block size 16A cannot be substantially the same size as the maximum latency budget X. This would cause any subsequently arriving FEC packets 18 in repair block 20A to be outside of the time period required to repair any of the source packets 14 in source block 16A.

Thus, (X-Q)-ms of source packets 16B are sent along with Q-ms of repair packets in repair block 20B. In other words, a smaller source block 16B is used and the remaining available time in the latency budget X is used for transmitting the FEC packets 18 in repair block 20B. The size of repair block 20B corresponds to the number of FEC packets 18 required to repair the same maximum outage duration Q. Also note that the source packets 14 and repair packets 18 do not overlap to avoid simultaneous loss during a loss event or a network outage. In this case, the overhead is as follows:

$$\text{Overhead} = Q \div (X-Q) \qquad \text{Equation 2.0}$$

The example in FIG. 2B again has a latency budget X proportional to 10 packets and a maximum outage duration Q proportional to 5 packets. Using equation 2.0, the repair overhead is:

Overhead=5÷(10−5)=1=100%.

Thus, the overhead is twice as much as the theoretical lower bound achieved in FIG. 2A.

Another loss-recovery technique for network outages uses path (spatial) diversity where source packets are injected into the network 30 in FIG. 1. The same source data is encapsulated into a retransmission payload format for transmission over the other path. This spatial diversity scheme is described in co-pending application Ser. No. 11/686,321, filed Mar. 14, 2007, entitled: UNIFIED TRANSMISSION SCHEME FOR MEDIA STREAM REDUNDANCY, which is herein incorporated by reference.

This dual source transmission technique does not require FEC encoding/decoding operations. Furthermore, extra delay is not induced in the media stream and works regardless of the outage duration as long as there are no simultaneous losses on the different paths.

Another temporal diversity technique transmits a copy of each source packet 14 Q ms after transmission of the original source packet. Here, Q is still the maximum outage duration that is intended to be repaired. This approach does not require FEC operations but introduces a delay of Q ms in the media stream and also requires 100% repair bandwidth overhead.

FEC Spatial Diversity

Figure 3:
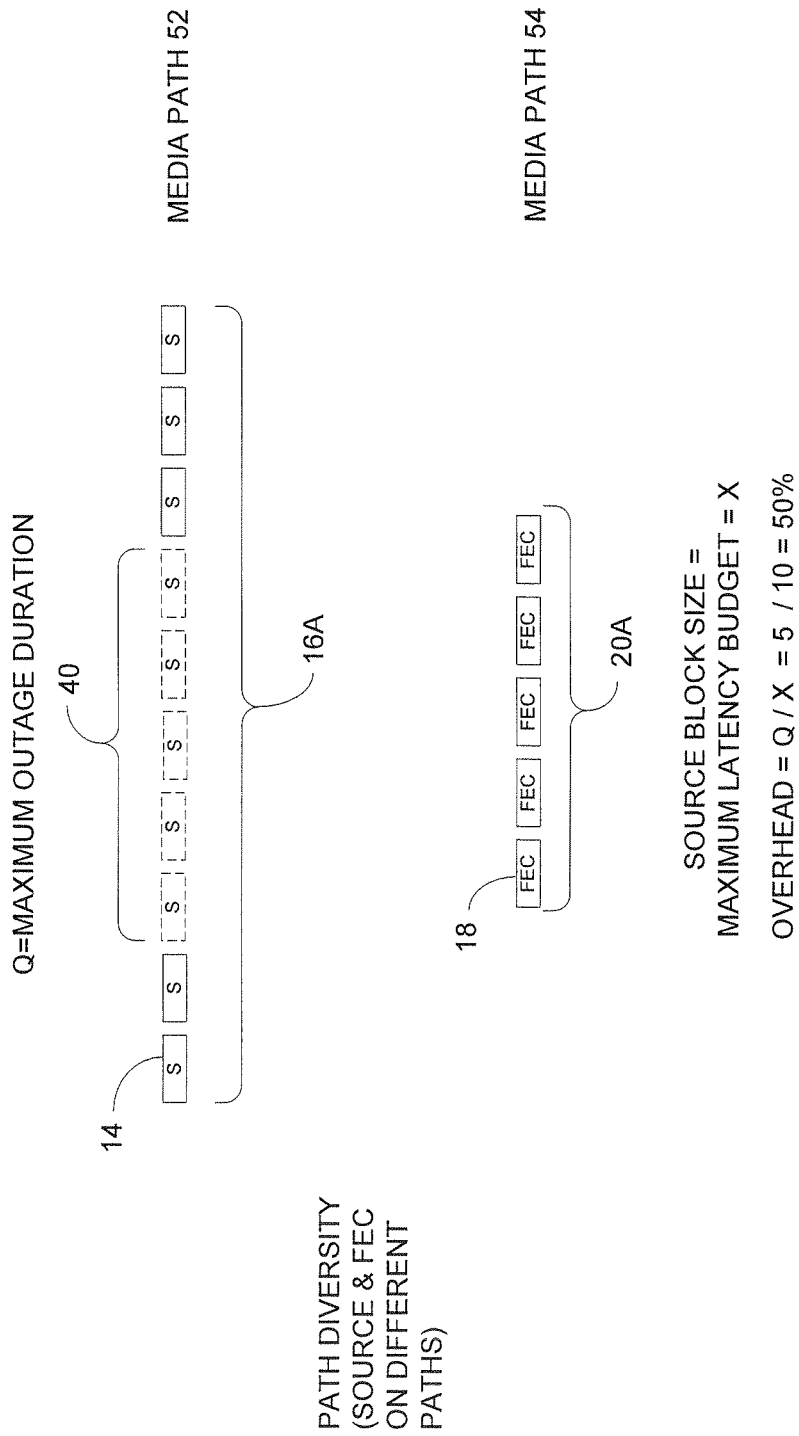
FIG. 3 is a diagram showing how spatial diversity is used to reduce some of the repair packet overhead shown in FIGS. 2A and 2B.

Referring to FIG. 3, to address some of the limitations of the repair schemes described above, the source packets 14 are sent on a first media path 52 and the FEC repair packets 18 are sent on a second different media path 54. This is referred to generally as FEC spatial diversity. Spatial or path diversity is compared with the temporal diversity shown in FIGS. 1, 2A, and 2B above where the source packets 14 and FEC packets 18 are sent over the same media path 24 but at different times.

Sending the source packets 14 and associated FEC packets 18 on different media paths 52 and 54, respectively, provides several advantages. First, less network overhead is required than either the temporal or spatial redundancy schemes described above. The spatial diversity also reduces delay introduced by the repair packets 18 when compared with temporal diversity.

The requirements on the latency budget X are also relaxed when the source packets 14 and repair packets 18 are transmitted on different media paths 52 and 54. This is because the source packets 14 and the repair packets 18 can be transmitted at the same time. Further, there is little likelihood that both the source packets 14 and the repair packets 18 will be simultaneously lost even when transmitted at the same time since the source and repair packet are transmitted on links with mutually uncorrelated error patterns.

Referring still to FIG. 3, an example latency budget X is still proportional to 10 source packets and the example maximum outage duration Q is still proportional to 5 source packets. Also note that the source block size 16A is substantially equal to the maximum latency budget X. Also note that in this example X=2Q ms. Refer first to the prior overhead equation 2.0 associated with temporal diversity.

Overhead=Q÷(X−Q).

With spatial FEC diversity, the source block size 16A can be the same as the maximum latency budget X. Therefore, the repair overhead equation is:

Overhead=Q/X,                Equation 3.0 which is equal to the theoretical lower bound.

In the example shown in FIG. 3, the repair overhead is therefore:

Overhead=5÷10=0.5=50%.

Note the large difference between Equation 2.0 where the denominator=(X−Q) and Equation 3.0 where the denominator=X. This difference is particularly significant when Q is comparable to X in size. Thus, using the spatial diversity scheme shown in FIG. 3 reduces the repair overhead by 50% compared to the repair overhead required by the temporal diversity scheme shown in FIG. 2B.

Figure 4:
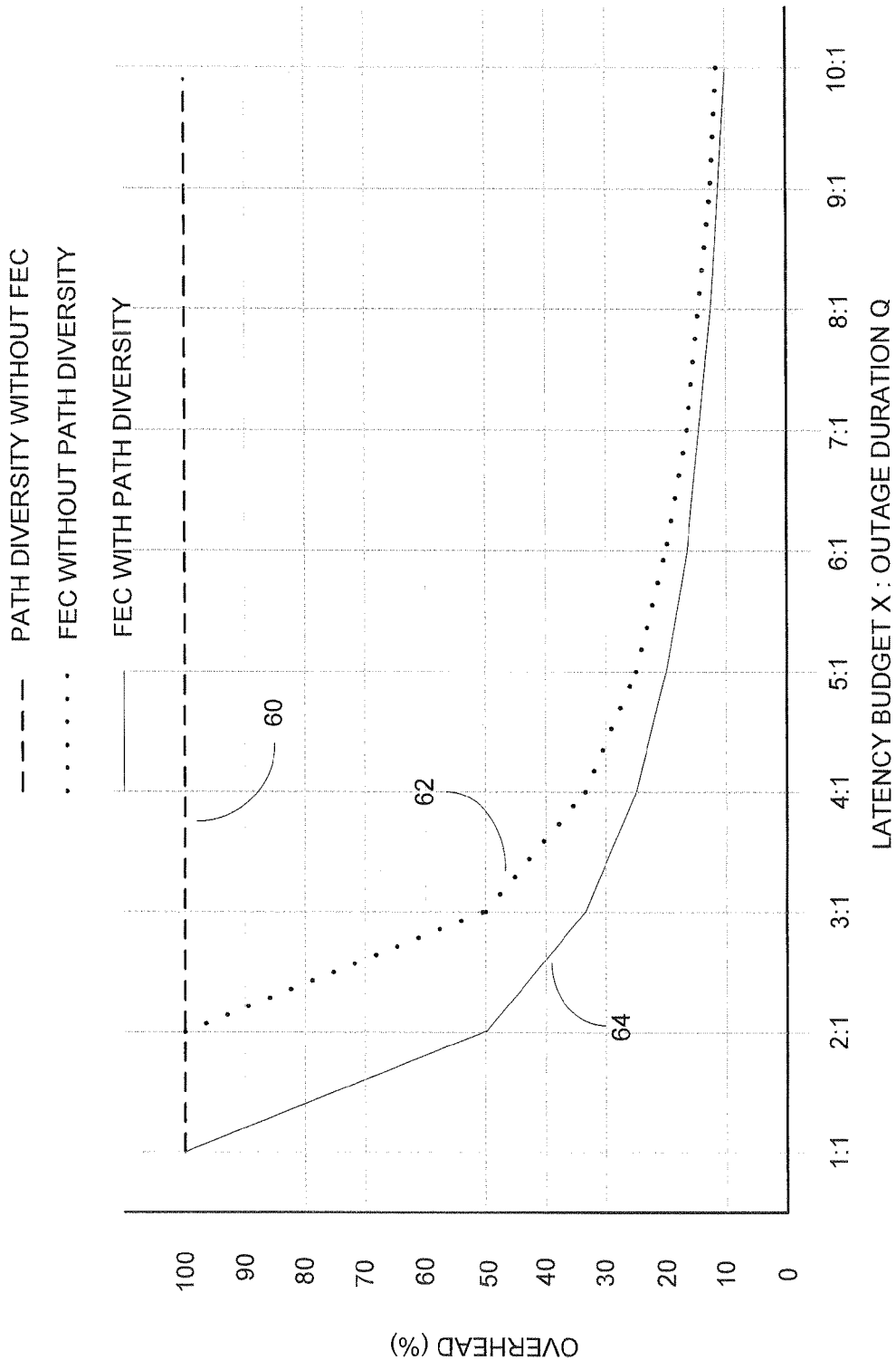
FIG. 4 is a graph that compares overhead for different media stream repair schemes.

The graph in FIG. 4 compares the repair overhead for different packet correction schemes. The y-axis shows the overhead introduced by FEC. The x-axis shows the latency budget X in terms of Q. The latency budget is the time difference between the first source packet in a particular source block 16 and the last FEC packet that belongs to the associated repair block 20. Each increment on the horizontal x-axis represents a ratio of the amount of repair data required to repair an outage duration Q and the amount of source data that can be sent with a latency budget X. For example, the first ratio value on the horizontal x-axis represents a ratio of 1:1 between the latency budget X and the outage duration Q. For example, a source block size of X=5 packets and repair block size of Q=5 packets. The second value on the horizontal x-axis represents a ratio between the latency budget X and the outage duration Q of 2:1. For example, a source block size of X=10 packets and a repair block size of Q=5 packets, etc.

The line 60 represents the overhead for path diversity without using FEC where two sets of the same source packets 14 are sent over two different media paths. The overhead is always 100% regardless of the ratio between the latency budget X and the outage duration Q.

The line 62 shows the overhead using FEC repair without path diversity. For example, line 62 represents the repair overhead associated with equation 2.0. Notice that at a ratio X:Q=1, FEC repair without path diversity is not feasible since there is no time available during the latency budget X for sending any FEC packets. At a ratio of X:Q=2, line 62 at horizontal location 2:1 shows the overhead using FEC repair without temporal diversity is 100% as previously described above in FIG. 2B.

Line 64 shows the repair overhead associated with the FEC repair with path diversity scheme described above in FIG. 3. Line 64 shows that at a ratio of X:Q=2:1 (second location on the horizontal x-axis), the overhead is 50%. This is compared to an overhead of 100% for FEC repair without path diversity as shown by line 62. As the ratio of X:Q increases, the latency budget X becomes substantially greater than the outage duration Q. Accordingly, the overhead required for FEC repair without path diversity as represented by line 62 starts to converge with the overhead required for FEC repair with path diversity as represented by line 64.

Thus, temporal diversity FEC requires Q<<X to have a decent overhead performance. However, spatial diversity FEC can tolerate much larger Q values at the same overhead cost. Spatial diversity FEC can also tolerate the cases Q=X where the temporal diversity FEC approach cannot. As shown in FIG. 4, there is no feasible solution using the temporal diversity approach when Q=X. Accordingly, it can be seen that FEC with path diversity provides substantial improvements in repair overhead efficiency, especially when Q is comparable to X in size.

Figure 5A:
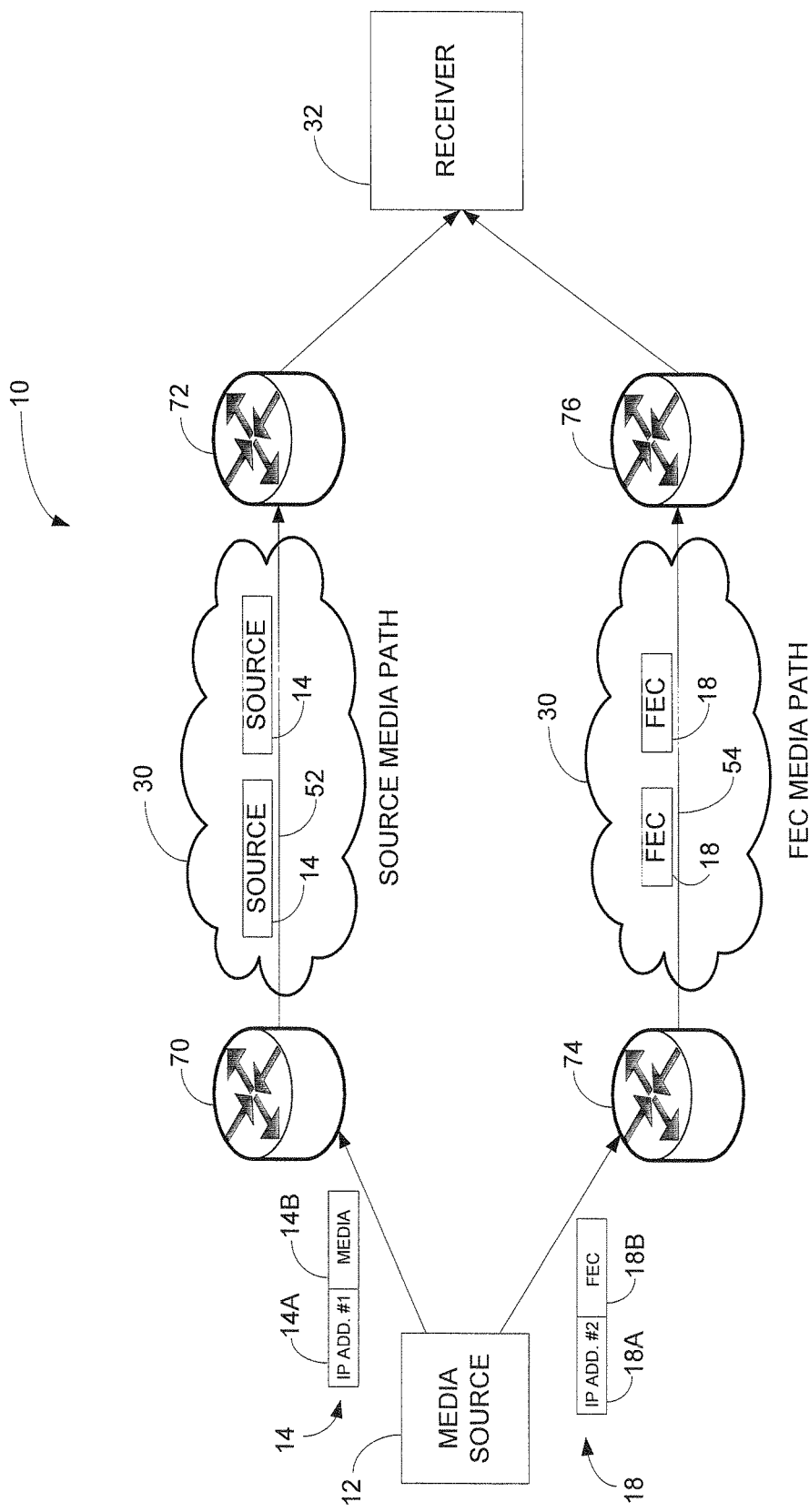
FIG. 5A is a diagram of a network that uses Forward Error Correction (FEC) with spatial diversity.

FIG. 5A shows one example of how FEC repair with path diversity is implemented. The media source 12 sends the source packets 14 over the first media path 52 in the network 30. The FEC packets 18 used for repairing the source packets 14 are sent over the second media path 54 in the network 30. It should be understood that different media paths 52 and 54 can refer to either a different logical links between two or more of the same network devices or can alternatively refer to different device media paths where a first set of network devices are used to transmit the packets 14 and one or more other different network devices are used to transmit packets 18.

In this example, the source 12 and receiver 32 operate as Real Time Protocol (RTP) mixer/translators (or equivalent for non-RTP media streams) taking a single media stream and splitting it into the main+FEC stream at the "source" and then at the receiver the main+FEC is reconstructed and either consumed locally or passed further as a non-redundant media stream.

Referring to FIG. 5A, the media source 12 uses a first destination Internet Protocol (IP) address or Multi-Protocol Label Switching (MPLS) label 14A with the media 14B in the source packets 14. The destination IP address or other label 14A causes the source packets 14 to be sent along the first media path 52 between routers 70 and 72. Of course, there may be additional links between routers and/or switches 70 and 72 in network 30 that together provide media path 52.

Similarly, the media source 12 uses a second different destination IP address or other MPLS label 18B with the FEC data 18B in repair packets 18. The destination IP address or other label 18A causes the repair packets 18 to be sent along the second media path 54 between routers/switches 74 and 76. Recall, that for logical link diversity, the same routers/switches may be used but the interfaces associated with the source packets 14 and FEC packets 18 may be different. For node diversity, the two packet streams must not converge at any router/switch along the path.

As described above, by using path diversity as shown in FIG. 5A, repair packet overhead is reduced by allowing the source block duration to be substantially equal to the latency budget X. Thus, the ratio of source packets 14 to repair packets 18 can be increased.

The spatial FEC diversity scheme can also be used with multicast packets as described in co-pending U.S. patent application Ser. No. 11/736,463 filed on Apr. 17, 2007, entitled MONITORING AND CORRECTING UPSTREAM PACKET LOSS, which is herein incorporated by reference. In this embodiment, the FEC packets 18 are multicast over the second media path 54. Multicast addressing used for transmitting multicast FEC packets 18 is also described in the above referenced co-pending patent application.

As another example, suppose the maximum outage duration (Q) is 500 ms and only a 1 second media delay (latency budget X) is allowable in the network 30. By combining FEC with path diversity, the repair overhead is reduced from 100% to 50%. If a 50% overhead is desirable, the delay is reduced from 1.5 seconds to 1 second. Delay reduction is beneficial in reducing the memory requirements for the network devices such as a Digital Content Manager (DCM) that generates the FEC packets 18.

In an alternate embodiment, multiple different servers 12 are used to send the different media streams (source diversity) and to improve the resiliency against packet losses. The source video is also protected by FEC at each server 12. Before each server starts streaming video, the receiver 32 first runs a rate allocation algorithm to determine the rate for each server 12, and then runs a packet partitioning algorithm to ensure that no packet is sent by more than one server 12. In another embodiment, a first server 12 may be used for sending the source packets 14 and a second different server may be used for sending the FEC repair packets 18 associated with the source packets 14.

Figure 5B:
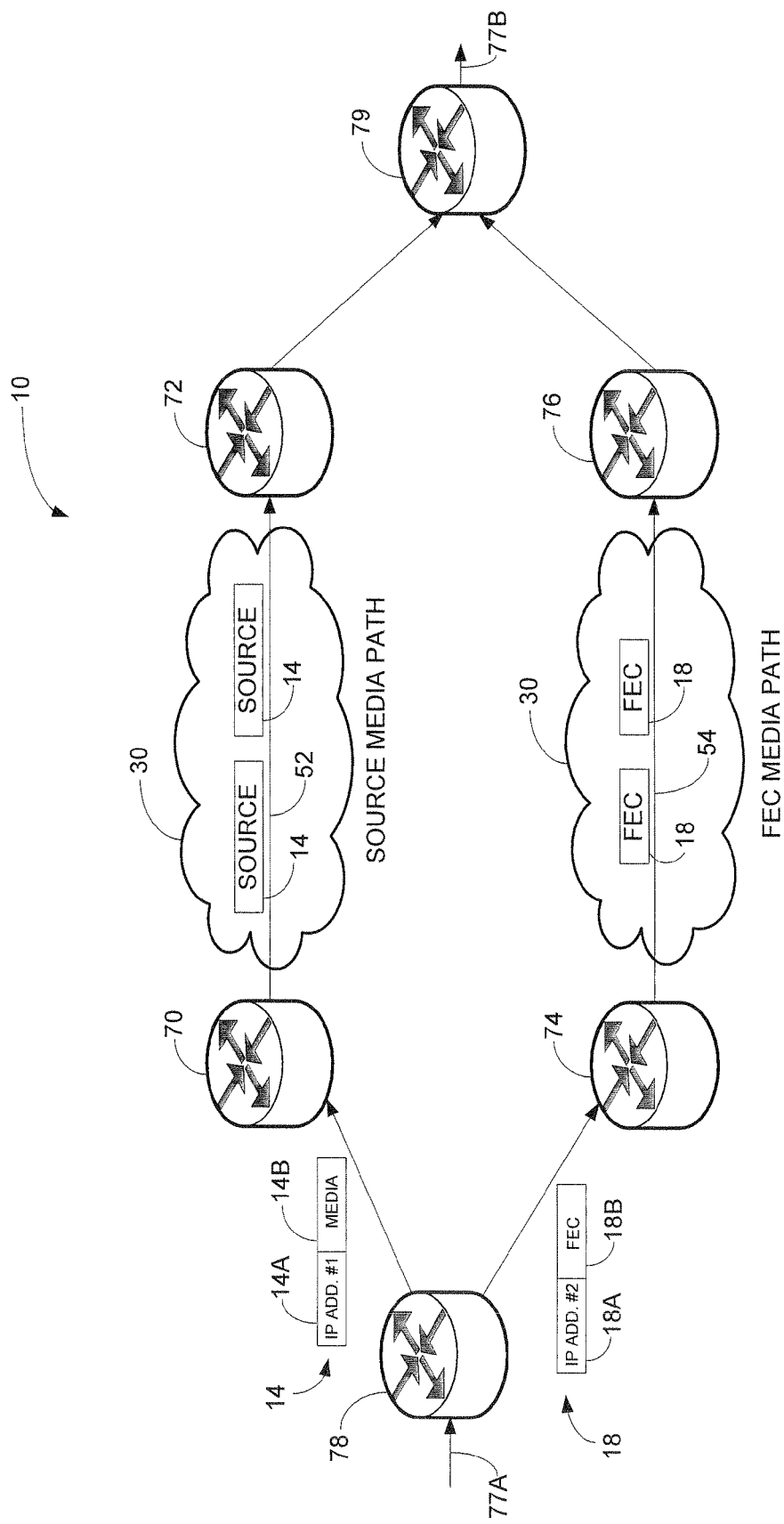
FIG. 5B shows how FEC spatial diversity is performed by intermediary network devices in a network.

FIG. 5B shows an alternative embodiment where two intermediary network devices 78 and 79, such as routers, switches, gateways, etc. operate as the two devices that establish spatial FEC diversity between the source packets 14 and FEC packets 18 over network 30. It should be understood, that the network 30 represents any portion of the Internet network where it may be advantageous to use temporal FEC diversity. For example, the initial link between a media source and the network 30 may have a highly reliable link or may have bandwidth restrictions that prevent or do not warrant temporal FEC diversity. Thus, temporal FEC diversity may be implemented in another portion of network 30 where link conditions and network bandwidth warrant spatial FEC diversity.

In FIG. 5B, the first intermediate network device 78 may receive one or more media streams 77A from a media source or from another section of the network. Similarly as described above in FIG. 5A, the intermediate network device 78 attaches a destination IP address or MPLS label 14A to the source packets 14 from the media stream 77A that cause the source packets 14 to travel over the first media path 52 in network 30 to a second intermediate network device 79.

The intermediate network device 78 may receive the FEC packets 18 over the same link that carries media stream 77A. Alternatively, the intermediate network device 78 may generate the FEC packets 18 from the media stream 77A. Either way, an IP address or MPLS label 18A is attached to the received or derived FEC packets 18 that cause the FEC packets to travel over the second media path 54 to the second intermediate network device 77B. Again the two media paths 52 and 54 may be different logical links or different physical paths between different network devices.

The second intermediate network device 79 may use the FEC packets 18 to repair any of the missing or corrupted source packets 14 received from network device 78. The second intermediate network device 79 then forwards the corrected media stream 77B to the one or more receiver(s) 32 shown in FIG. 5A.

Distributing Source Packets

Figure 6:
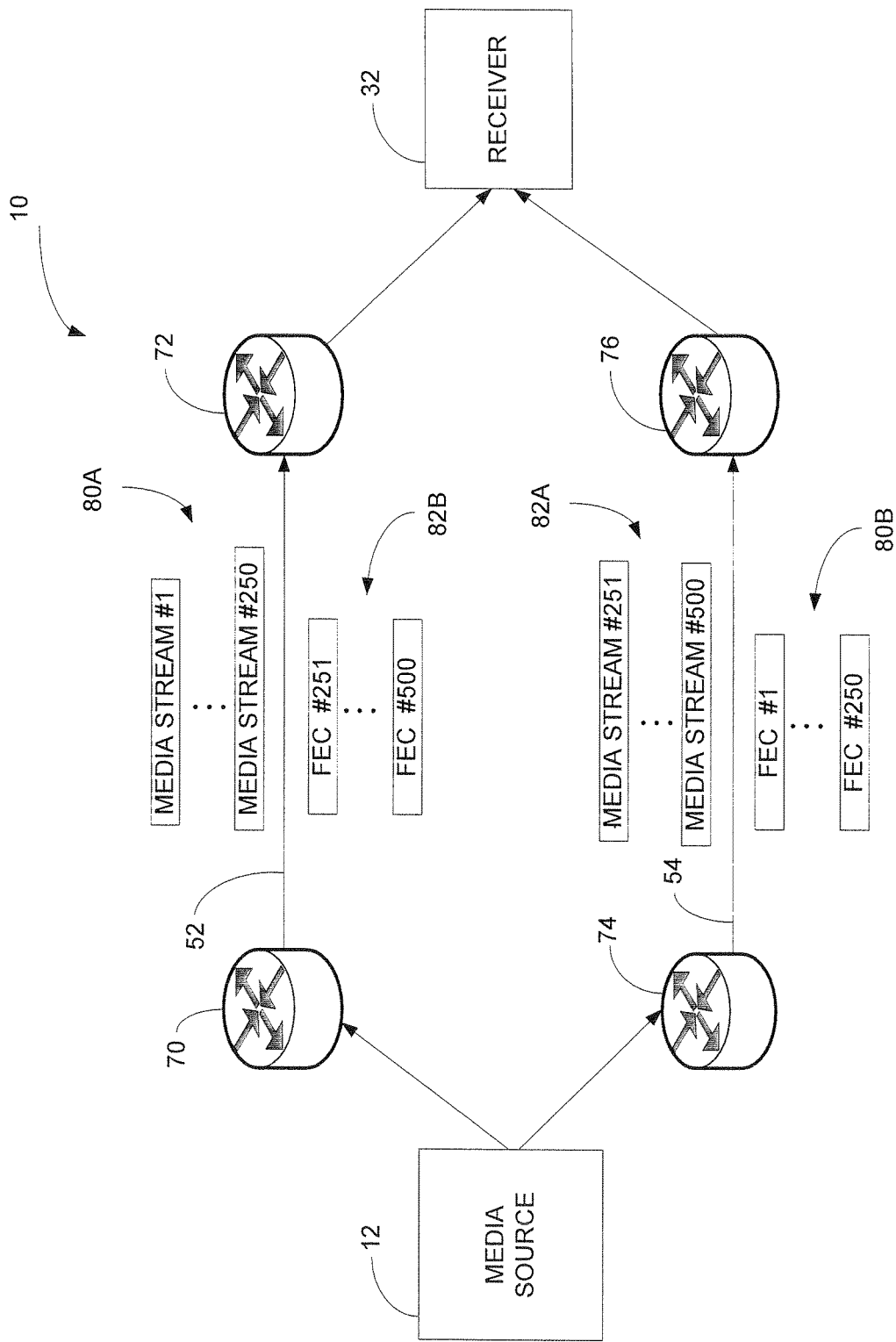
FIG. 6 is a diagram of a network that provides load balancing and FEC spatial diversity.

Referring to FIG. 6, when multiple media streams (say 500) are transmitted between the media source 12 and different, or the same, receiver(s) 32. The FEC streams 80B generated from a first set of source streams 80A and the set of FEC streams 82B generated from a second set of source streams 82A are equally split among the two different media paths (data planes) 52 and 54 such that each media path 52 and 54 carries approximately 50% of the source packets and 50% of the FEC packets. This provides load balancing for both planes 52 and 54 regardless of the number of source streams 80A and 82A.

For example, the load is balanced on both media paths 52 and 54 by transmitting half of the source streams 80A and half of the FEC streams 82B on the first media path 52. The other half of the media streams 82A and the other half of the FEC streams 80B derived from media stream 80A are transmitted on the second media path 54. That is, the source data for 250 of the media channels 80A and the FEC data 82B for the other 250 channels 82A are transmitted on the first media path 52. The second media path 54 carries the rest of the source data for media channels 82A and the FEC data 80B for the first group of media channels 80A. This provides equal load on both data planes 52 and 54 regardless of the FEC overhead.

Figure 7:
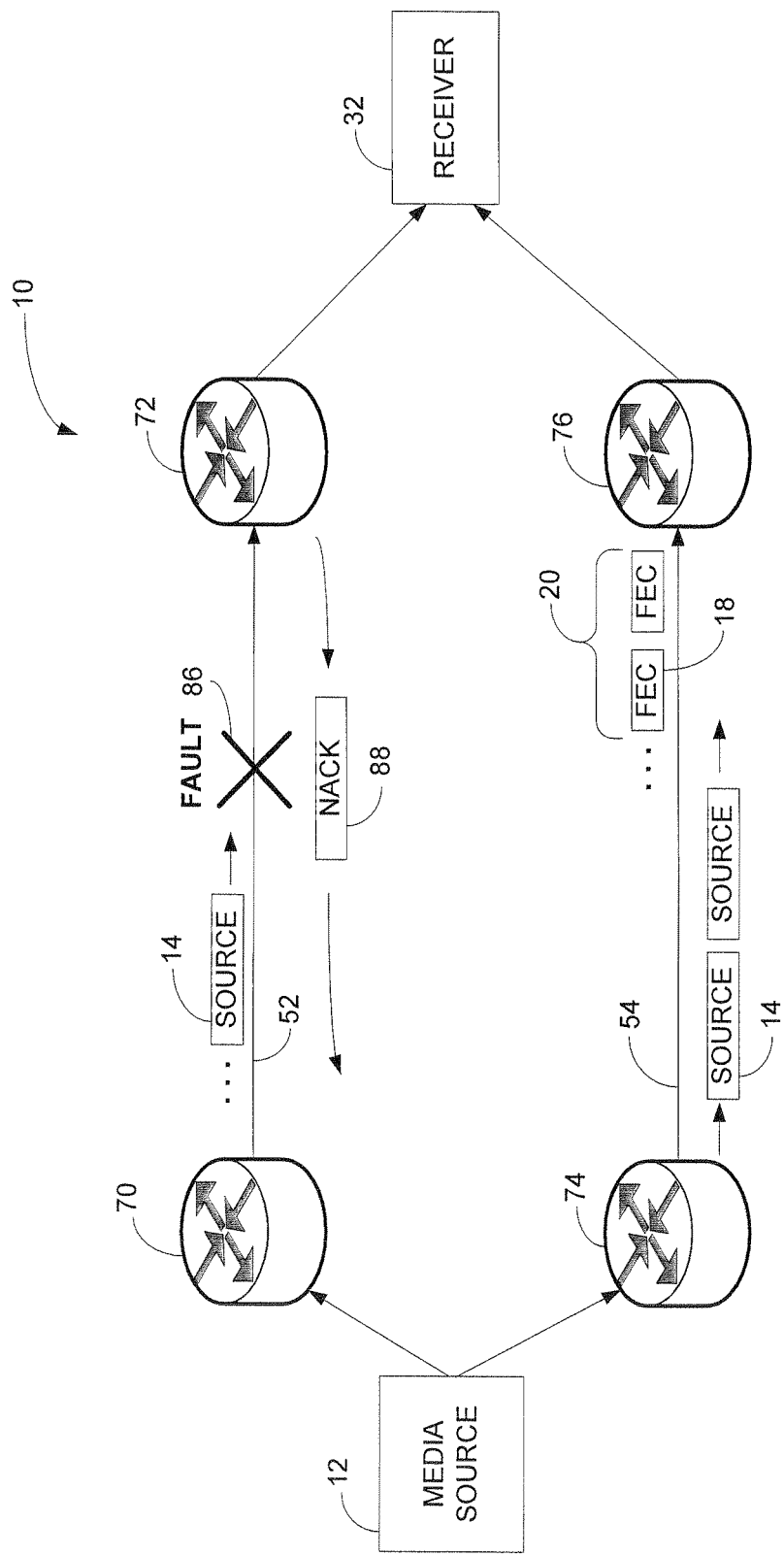
FIG. 7 is a diagram of a network that redirects source packets over an FEC network path when a fault condition is detected.

Referring to FIG. 7, when the duration of repair block 20 is large enough relative to a failure detection time, failures can be detected on either media path 52 or 54. In this case, the media source 12 can switch to single stream operation and start sending source data only on the working data plane 52 or 54 and still achieve zero loss at the receivers. This is again a lower-overhead redundancy approach compared to full stream redundancy.

A fault 86 may be detected on the media path 52 when a Negative ACKnowledgement (NACK) or any other routing algorithm status message 88 is sent back to the media source 12 by one of the routers 70 or 72 or from the receiver 32. After receiving the NACK message 88, the media source 12 stops sending FEC packets 18 over media path 54 and redirects the source packets 14 from media path 52 to media path 54.

Example types of fault detection and notification can include a Multi-Protocol Label Switching (MPLS)-capable network, receiving a Label-Switched Path (LSP) teardown signal or a LSP reroute request signal in protocols like Label Distribution Protocol (LDP) or Resource Reservation Protocol for Traffic Engineering (RSVP-TE). A link-state update can be used in the Open Shortest Path First (OSPF) or Intermediate System (IS) ISIS Interior Gateway Protocol (IGP) or a Border Gateway Protocol (BGP) route withdrawal is received covering the media destination on one of the two paths. A notification of an interface failure can be received, or adjacency failure via Bi-directional Forwarding Detection (BFD) protocol can be used at the source system.

Figure 8:
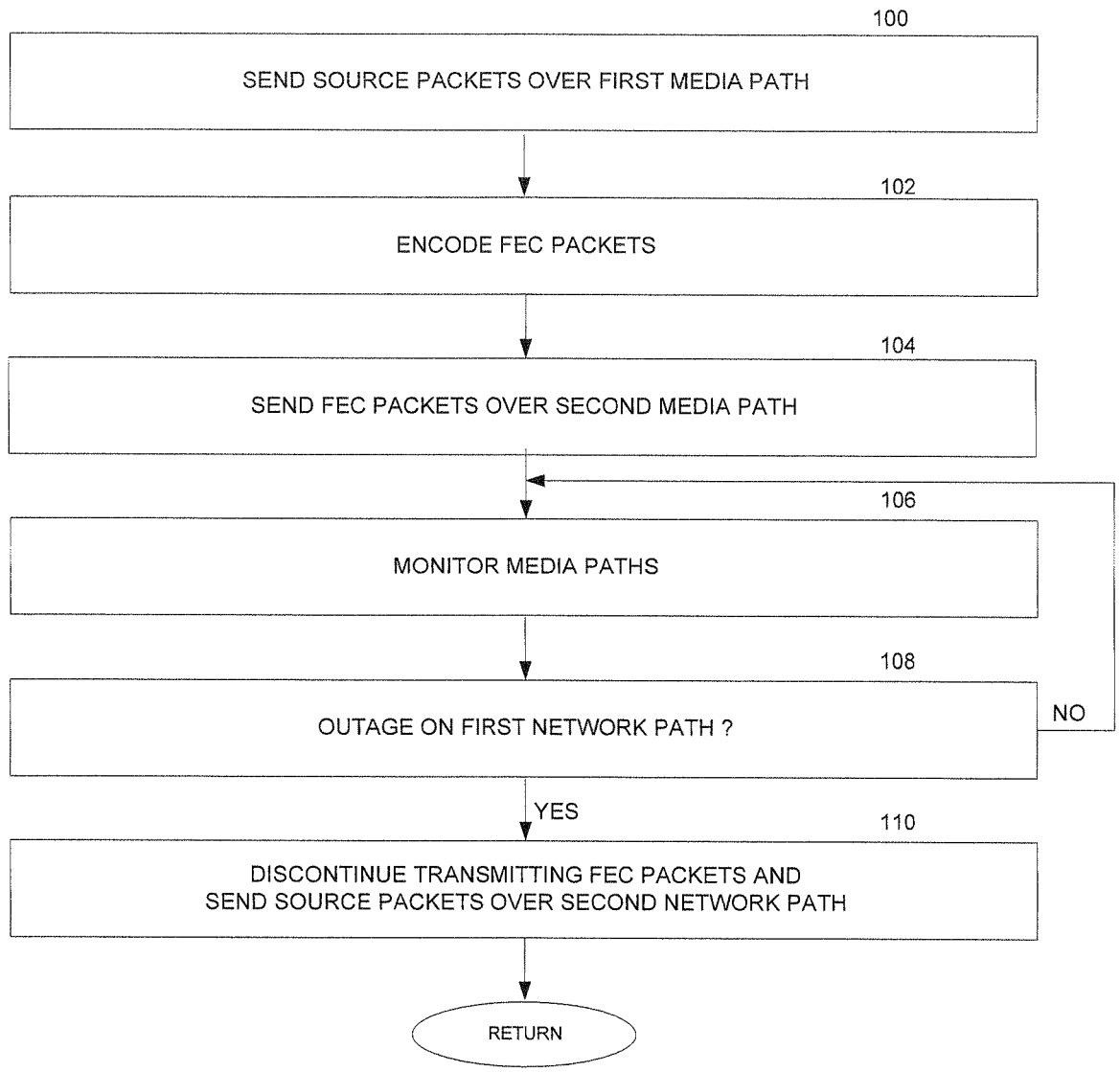
FIG. 8 is a flow diagram that further explains how a media source redirects the source packets in FIG. 7.

Referring to both FIGS. 7 and 8, the media source 12 sends source packets 14 over the first media path 52 in operation 100. The FEC packets 18 for the source packets 14 are encoded in operation 102 and sent over the second media path 54 in operation 104. The source packets 14 could also be sent over media path 54 and the FEC packets 18 could be sent over media path 52 at the same time.

In operation 106, the media source 12 monitors the media paths 52 and 54 for outages 86. Upon detecting a long-duration failure 86 on media path 52 in operation 108, the media source 12 switches to a single stream operation and starts sending source packets 14 only (no FEC) on the working media path 54 in operation 110. No longer bounded by the repair block size, the media source 12 can perform a full recovery by transmitting the source packets 14 over media path 54 that were lost on the media path 52. This provides a lower-overhead redundancy approach compared to full stream redundancy. Conventional FEC schemes continue to send FEC packets and, hence, are still required to recover missing data within the latency budget. Thus, full recovery probability is significantly lower. If the disabled media path 52 comes back up, media source 12 may start sending source packets 14 again on media path 52 and start sending the FEC packets 18 again on media path 54. Alternatively, the media source 12 may continue to send the source packets 14 over media path 54 and start sending the associated FEC packets 18 on the recovered media path 52. The recovery of the media path 52 can be detected via routing protocol status messages.

If the media path 54 carrying the FEC packets 18 goes down, the media source 12 does not need to take any action. However, when the media path 52 normally carrying the source packets 14 goes down, the media source 12 stops sending the FEC packets 18 and starts transmitting the source packets 14 on the working media path 54.

The switching scheme described in FIGS. 7 and 8 also works in conjunction with the load balancing scheme previously shown in FIG. 6. For example, FIG. 6 shows how multiple media streams 80A and 82A were sent on the different media paths 52 and 54, respectively. In FIG. 6, the repair packets 80B for media streams 80A are normally transmitted over media path 54 and the repair packets 82B for media streams 82A are normally transmitted over media path 52.

If a long-duration failure is detected on media path 52, the media source 12 might stop sending the repair packets 80B on the media stream 54 and instead starts transmitting media streams 80A on media path 54. Similarly, a long-duration failure may be detected on media path 54. Accordingly, the media source 12 stops sending the repair packets 82B on the media stream 52 and instead starts transmitting media streams 82A on media path 52.

Figure 9:
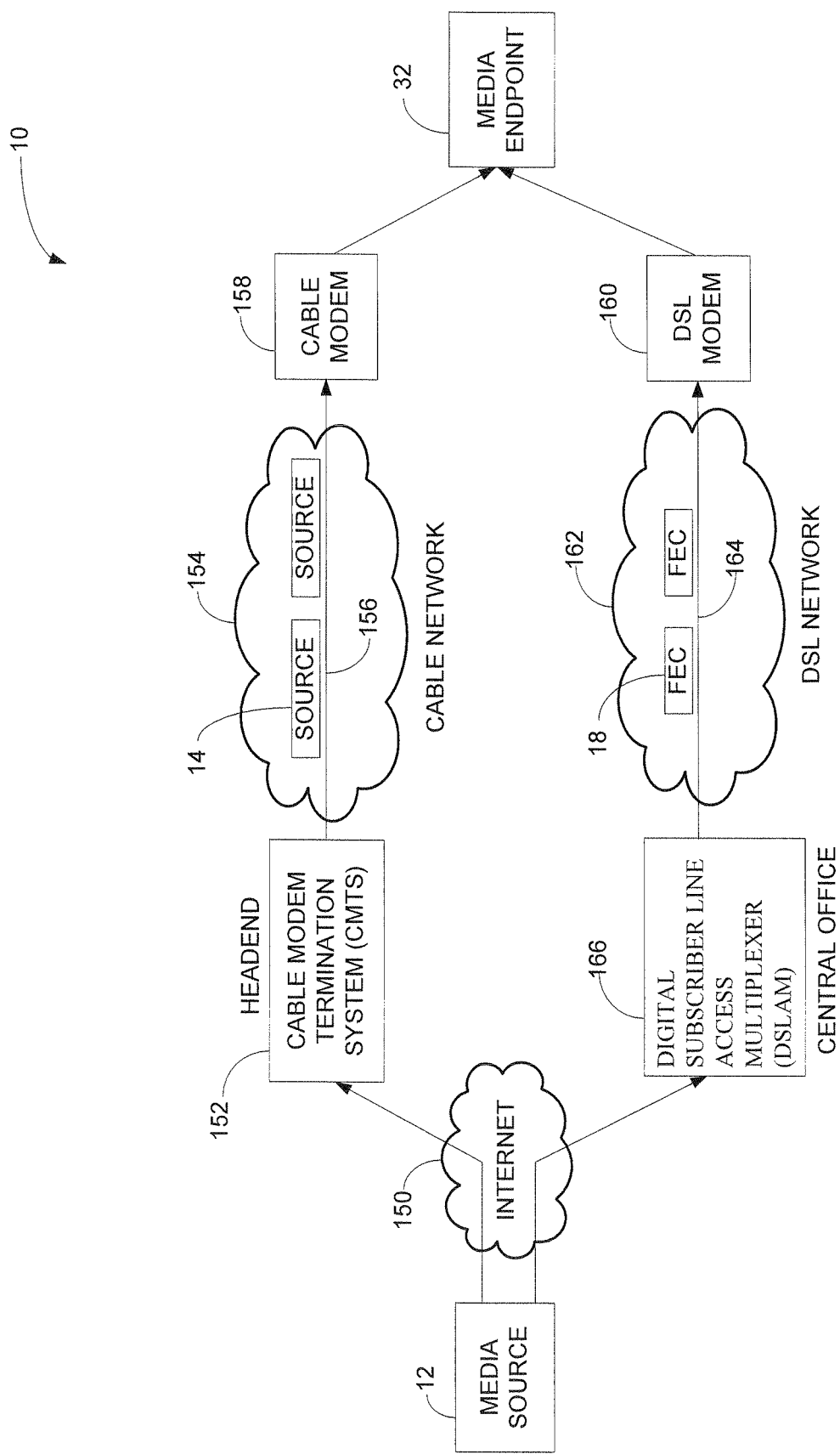
FIG. 9 is a diagram of two different networks that are used for providing FEC spatial diversity.

FIG. 9 shows how the FEC spatial diversity schemes described above can be used with different networks. For example, a first cable network 154 may include a Cable Modem Termination System (CMTS) 152 located at a cable headend. The CMTS 152 sends packets over a media path 156 in the cable network 154 to one or more cable modems 158. The cable modems 158 then convert the packets into signaling used by a media endpoint 32, such as a television, set-top box, personal computer, or other wired or wireless device.

A Digital Subscriber Line (DSL) network 162 may include a Digital Subscriber Line Access Multiplexer (DSLAM) 166 located at a telephone company central office. The DSLAM 166 sends packets over a media path 164 in the DSL network 162 to one or more DSL modems 160. The DSL modems 160 then convert the packets into digital signals used by the same media endpoint 32.

The media source 12 can send the different source packets 14 over the cable network 154 or DSL network 162 and send the associated FEC repair packets 18 over the other cable or DSL network. In this example, the media source 12 sends the source packets 14 over Internet network 150 to the CMTS 152. The CMTS 152 forwards the source packets 14 over the media path 156 in cable network 154 to the cable modem 158. The cable modem 158 then converts the source packets 14 into signaling compatible with media endpoint 32.

In this example, the media source 12 sends the source packets 14 over the media path 156 of cable network 154 and sends the FEC packets 18 over the media path 164 in DSL network 162. If there is a failure in the media path 156 of cable network 154, then the media source 12 starts sending the source packets 14 over Internet network 150 to the DSLAM 166. The DSLAM 166 then forwards the source packets 14 over media path 164 to the DSL modem 160. The media endpoint 32 upon failing to receive source packets from the cable modem 158 then switches to receiving the source packets 14 from the DSL modem 160.

Figure 10:
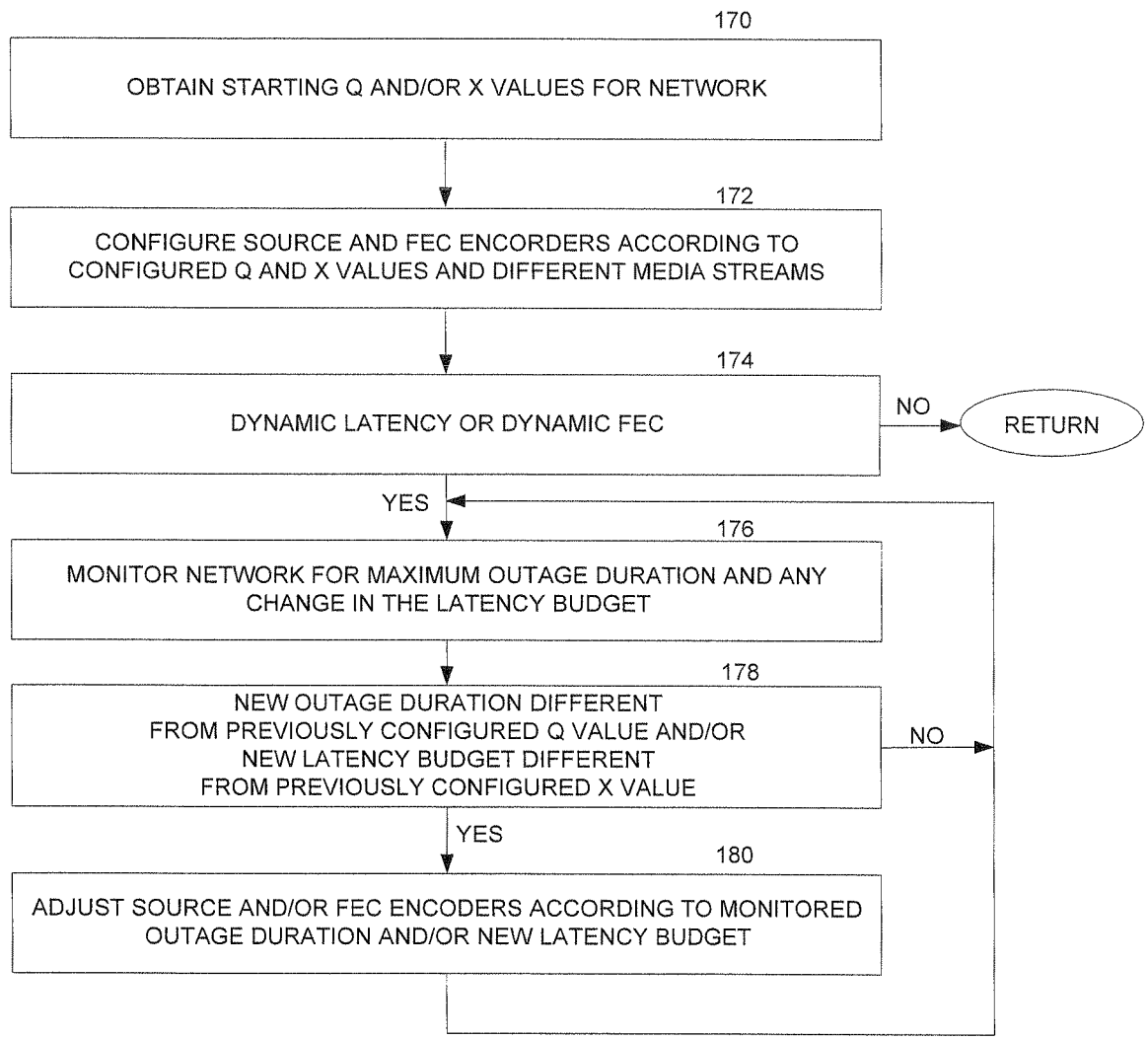
FIG. 10 is a flow diagram showing how FEC encoding can be changed according to detected network outage duration.

FIG. 10 shows another embodiment where the amount of FEC data is dynamically adapted according to the monitored outage duration Q and/or according to a different latency budget for the network 30 in FIG. 5. If the X and/or Q values change over time, the source packet encoder and FEC encoder can be reconfigured to adjust the size of the source blocks 16 and/or the amount of FEC protection to correspond with the new X and/or Q values.

Referring both to FIGS. 5 and 10, X and Q values for network 30 are obtained in operation 170. The X and Q values may be obtained through empirical data measured for the network 30 and/or may be set by the network operator. The source and FEC encoders in media source 12 are then configured in operation 172 according to the X and Q values. For example, the source block size 16 is generated according to the latency budget X and the repair block size 20 is generated to correct the maximum outage duration 40 shown in FIG. 3.

If a dynamic latency budget operation is enabled in operation 174, then the media source 12 in operation 176 monitors for any changes to the latency budget. For example, the media source 12 may receive a new latency budget value X from a network administrator.

If dynamic FEC is enabled in operation 174, then the media source 12 in operation 176 tracks all further outage durations. For example, the media source 12 may receive NACK messages back from the receivers 32 that indicate the number of source packets 14 that are typically dropped on media path 52. The feedback might be in NACKs, if retransmission is configured for the stream. However, reception reports can also be used such when RTP is used as the transport protocol, RTCP receiver reports could be used.

Alternatively, the network operator may manually modify the Q value for particular media streams. For example, during a football telecast, the network administrator may want to generate the highest possible repair block size 20 to increase the reliability of the transmitted media stream. If the new latency budget X is different from the previously configured latency budget X in operation 178, the encoder in the media source is adjusted in operation 180 according to the new X value. For example, if the new latency budget X is larger, the encoder in the media source 12 may be adjusted to generate larger source blocks 16. If the new latency budget X is smaller, smaller source blocks 16 may be generated.

If the new outage duration Q is different from the previously configured outage duration Q in operation 178, the FEC encoder is adjusted in operation 180 according to the new Q value. For example, if the new Q value is smaller than the previous Q value, then the FEC encoder may be adjusted to generate a smaller FEC repair block 20. If the new Q value is larger than the previous Q value, then the FEC encoder may be adjusted to generate a larger FEC repair block 20. It should understood that any of the examples shown and described in FIGS. 6-10 could be different parts of the network where the media source 12 and the receiver 32 are instead other intermediate nodes 78 and 79 as shown in FIG. 5B. For example, any of the examples described in FIGS. 6-10 could be used in the portion of the network described above in FIG. 5B.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. An apparatus, comprising:
one or more network devices configured to:
send source blocks of source packets over a first link;
encode repair blocks of repair packets from the source blocks of the source packets;
send the repair blocks over a second link;
identify a change in a maximum outage duration Q for the first link;
adjust a size of the source blocks sent over the first link according to the change in the maximum outage duration Q;
adjust a number of the repair packets in the repair blocks sent over the second link to repair the adjusted size source blocks; and
transmit the adjusted source packets and the adjusted repair packets using the second link;
wherein no repair information for the source packets is transmitted using the first link.

2. The apparatus according to claim 1, wherein the one or more network devices are further configured to identify a change in a latency budget X for the source blocks and adjust the size of the source blocks and the number of repair packets in the repair blocks according to the change in the maximum outage duration Q and the change in the latency budget X.

3. The apparatus according to claim 2, wherein:
the size of the source blocks is approximately equal to the latency budget X;
the duration of the repair blocks is approximately equal to the maximum outage duration Q; and
a bandwidth overhead for sending the repair blocks is approximately equal to Q/X.

4. The apparatus according to claim 1, wherein the one or more network devices are further configured to:
send a first set of media streams over the first link;
send a second set of media streams different from the first set of media streams over the second link;
encode a first group of repair packets for the first set of media streams and only send the first group of repair packets over the second link; and
encode a second group of repair packets for the second set of media streams and only send the second group of repair packets over the first link.

5. The apparatus according to claim 4, wherein the one or more network devices are further configured to:
detect a failure on the first link;
stop sending the second group of repair packets on the second link in response to detecting the failure on the first link; and
start sending the first set of media streams on the second link in response to detecting the failure on the first link.

6. The apparatus according to claim 1 wherein the one or more network devices are further configured to:
detect a failure on the first link;
stop sending the repair packets on the second link when the failure is detected on the first link; and
redirect the source packets from the first link to the second link or device media path.

7. The apparatus according to claim 6, wherein the first link is established over a first cable access network and the second link is established over a Digital Subscriber Line (DSL) access network.

8. The apparatus according to claim 1, wherein the source packets and the repair packets are multicast over the first and second links.

9. The apparatus according to claim 1, wherein the source packets and repair packets are unicast over the first link and second link.

10. The apparatus of claim 1, wherein the source packets are addressed to a first IP address and all the repair packets are addressed to a second different IP address.

11. A method for operating a network processing device, comprising:

sending source packets over a first network path, the generated source packets for transmitting media;
generating Forward Error Correction (FEC) packets from the media for repairing the source packets;
sending the generated FEC packets over a second network path;
identifying a change in an outage duration Q for the first network path;
adjusting a number of the source packets sent over the first network path according to the change in the maximum outage duration Q;
adjusting a number of the FEC packets sent over the second network path to repair the adjusted source packets; and
transmitting the adjusted source packets and the adjusted FEC packets using the second network path;
wherein no FEC information for the source packets is transmitted using the first network path.

12. The method according to claim 11, wherein the first and second network paths are different logical links or different network device paths.

13. The method according to claim 11, further comprising:
sending a first set of the source packets over the first network path;
sending a second set of the source packets over the second network path;
sending a first set of FEC packets for the first set of source packets over the second network path and not sending the first set of FEC packets over the first network path; and
sending a second set of FEC packets for the second set of source packets over the first network path and not sending the second set of FEC packets over the second network path.

14. The method according to claim 11, further comprising:
determining a latency budget duration X;
determining the outage duration Q;
generating source blocks of the source packets proportional to the latency budget duration X;
sending the source blocks of the source packets over the first network path;
generating repair blocks of the FEC packets proportional to the outage duration Q;
sending the repair blocks of the FEC packets over the second network path; and
adaptively changing the value of Q based on at least one of: empirical data, administrative policies, and an importance of the media in the source packets.

15. The method according to claim 14, further comprising dynamically changing the value of X based on at least one of: the empirical data, the administrative policies, and the importance of the media in the source packets.

16. The method according to claim 14, wherein a duration of the source blocks and a duration of the repair blocks have an associated repair overhead of approximately Q/X.

17. The method according to claim 16, wherein the outage duration Q is comparable or equal to the latency budget duration X.

18. The method according to claim 11, further comprising:
using a first Internet Protocol (IP) destination address or MPLS label in the source packets associated with the first network path; and
using a second IP destination address or MPLS label in the FEC packets associated with the second network path.

19. The method according to claim 11, further comprising:
sending a first set of media streams over the first network path;
sending a second set of media streams over the second network path;
sending a first set of FEC packets for the first set of media streams over the second network path and not over the first network path;
sending a second set of FEC packets for the second set of media streams over the first network path and not over the second network path;
detecting an outage on the first network path;
stopping the sending of the FEC packets for the first set of media streams over the second network path; and
starting the sending of the first set of media streams over the second network path.

20. The method according to claim 11, further comprising:
detecting a network failure on the first network path used by the transmitted source packets;
discontinuing transmission of the FEC packets on the second network path; and
redirecting the transmission of the source packets over the second network path.

21. An apparatus, comprising:
a receiving network device configured to receive, from a server, a first media stream on a first interface of a plurality of network interfaces of the receiving network device;
the receiving network device configured to receive, from the server, on a second interface of the plurality of network interfaces, a first set of Forward Error Correction (FEC) packets for repairing the media stream; and
in the event of a repairable transmission error, the receiving network device configured to repair the first media from the first interface using the first set of FEC packets from the second interface, wherein the server is further configured to:
determine a duration Q of the repairable transmission error for the first interface;
adjust a number of source packets sent to the first interface according to the determined duration Q;
adjust a number of FEC packets sent to the second interface to repair the adjusted source packets.

22. The apparatus according to claim 21, wherein the receiving network device is further configured to:
receive a second media stream on the second interface; and
receive, on the first interface, a second set of FEC packets for repairing the second media stream.

23. The apparatus according to claim 22, wherein the receiving network device is further configured to:
receive the first media stream over the first interface and receive the second media stream over the second interface until a link fault is detected;
receive both the first media stream and the second media stream over a same one of the first and the second network interfaces after the path or link fault is detected; and
no longer receive any FEC packets on the same one of the first and second network interface that receives both the first media stream and the second media stream after the path or link fault is detected.

24. The apparatus according to claim 22, further comprising:
receiving the first media stream on the first interface until a path of link fault is detected;
no longer receiving the first set of FEC packets on the second interface after the path or link fault is detected; and
receiving the first media stream previously received on the second interface after the path or link fault is detected.

* * * * *